United States Patent
Yokota et al.

(10) Patent No.: US 7,155,607 B2
(45) Date of Patent: Dec. 26, 2006

(54) METHOD FOR AUTHENTICATION BETWEEN APPARATUSES USING CHALLENGE AND RESPONSE SYSTEM

(75) Inventors: Kaoru Yokota, Ashiya (JP); Makoto Tatebayashi, Takarazuka (JP); Motoji Ohmori, Hirakata (JP)

(73) Assignee: Matsushita Electric Industrial Co., Ltd., Osaka-Fu (JP)

( * ) Notice: Subject to any disclaimer, the term of this patent is extended or adjusted under 35 U.S.C. 154(b) by 891 days.

(21) Appl. No.: 10/369,644

(22) Filed: Feb. 21, 2003

(65) Prior Publication Data

US 2003/0159041 A1 Aug. 21, 2003

(30) Foreign Application Priority Data

Feb. 21, 2002 (JP) .............................. 2002-044156

(51) Int. Cl.
*H04L 9/00* (2006.01)
*H04K 1/00* (2006.01)

(52) U.S. Cl. ...................... 713/168; 380/270; 380/272; 380/273

(58) Field of Classification Search ............... 380/259, 380/272, 273
See application file for complete search history.

(56) References Cited

U.S. PATENT DOCUMENTS 5,872,917 A * 2/1999 Hellman ........................ 726/6

| | | | | |
|---|---|---|---|---|
| 5,937,065 | A * | 8/1999 | Simon et al. | 380/262 |
| 6,043,752 | A * | 3/2000 | Hisada et al. | 340/5.26 |
| 6,377,691 | B1 * | 4/2002 | Swift et al. | 380/277 |
| 6,535,980 | B1 * | 3/2003 | Kumar et al. | 713/168 |
| 2002/0007412 | A1 * | 1/2002 | Paridaens et al. | 709/229 |

OTHER PUBLICATIONS

R. Anderson, "Security Engineering: A Guide to Building Dependable Distributed Systems", p. 17, John Wiley & Sons (Publisher), 2001, U.S.A.
Menezes, Vanstone, Oorschot: "Handbook of Applied Cryptography" 1997, CRC Press LLC, USA XP0022882273, pp. 397-404, 490-493, 568 and 580.

* cited by examiner

*Primary Examiner*—Matthew Smithers
(74) *Attorney, Agent, or Firm*—Wenderoth, Lind & Ponack, L.L.P.

(57) ABSTRACT

An object of the present invention is to provide a technology to improve security against spoofing in a method of authentication using a challenge and response system.

In the method of authentication of the present invention, the piece of challenge data is transmitted from the sever 10 to the terminal 20 (S104), and then the piece of response data, which is the decrypted challenge data (S105), is transmitted from the terminal to the server (S107). Further, whether the piece of response data is the piece of challenge data decrypted or not is judged based on encryption performed in the server 10 (S109). When the result of judgment is affirmative, the parameter used both for encryption and decryption is renewed to a parameter to be used in the next authentication (S111, S112).

16 Claims, 15 Drawing Sheets

METHOD FOR AUTHENTICATION BETWEEN APPARATUSES USING CHALLENGE AND RESPONSE SYSTEM

BACKGROUND OF THE INVENTION (1) Field of the Invention

The present invention relates to a method for authentication between apparatuses using challenge and response system. Specifically, it relates to a technique for improving security against so-called spoofing (gaining access by pretending to be someone else).

(2) Description of the Related Art

A challenge and response system has been commonly used in authentication between apparatuses.

FIG. 1 shows a construction of a server and a terminal in a common challenge and response system.

A server 130 comprises a random number generating unit 131, a key storing unit 132, a data converting unit 133, and a comparing unit 134. A terminal 140 comprises a key storing unit 141 and a data converting unit 142. A key data K is secretly assigned in advance to both the key storing unit 132 in the server 130 and the key storing unit 141 in the terminal 140. The key data is assigned by such a way in which the server 130 issues the key data K to a user of the terminal 140 when the terminal 140 is registered as an authorized terminal by the sever 130, and then the user sets up using the key data K.

The following is steps in which the server 130 authenticates that the terminal 140 is authorized.

Step 1: The server 130 generates a random number R in the random number generating unit 131 and sends the random number R as a piece of challenge date to the terminal 140.

Step 2: The terminal 140 receives the random number R from the server 130; the data converting unit 142 obtains a data D as follows, using the random number R and the key data K stored in the key storing unit 141, and the terminal 140 sends the data D as a piece of response data to the server 130.

$$D = F(K, R)$$

F(X, Y) indicates an operation in which a predetermined conversion is applied to Y taking X as a parameter and a result of the conversion is output. Z=F(X, Y) is required to be such that an operation for obtaining X is difficult when Z and Y are given.

Step 3: In the server 130, the data converting unit 133 obtains a data E as follows, using the random number R and the key data K stored in the key storing unit 132.

$$E = F(K, R)$$

Step 4: The server 130 compares the response data D received from the terminal 140 and the data E obtained in the step 3; only when the data D and E are identical, the server 130 authenticates the terminal 140.

A detailed explanation about the challenge and response system in general can be found in the following reference: Ross Anderson, *Security Engineering—a Guide to Building Dependable Distributed Systems*, John Wiley & Sons, Inc., 2001, p. 17 (2.2.1 Challenge and Response).

On the other hand, the above-described conventional example has such a problem explained below in terms with security.

Assuming that there was a third party who was eavesdropping communication between the server 130 and the terminal 140 (hereinafter referred to as the third party), and that the third party obtained the pieces of challenge data R and the corresponding pieces of response data D exchanged in each authentication, and stored the sets of data, it is possible that the third party pretends to be an authorized user in a following way.

When the third party accessed to the server 130, the server 130 sends a piece of challenge data R to the third party. The third party looks into the stored sets of data to find the identical piece of challenge data R. If there was the identical piece of challenge data R, the third party sends a piece of response data D corresponding to the piece of challenge data R to the server 130.

As in the above example, in a case the same challenge data that was used once is reused, it is possible that the third party is illegally authenticated and can pretend to be an authorized user. In particular, the challenge data is more likely to be reused when size of the challenge data is small, and a problem of spoofing becomes a greater issue.

SUMMARY OF THE INVENTION

The present invention is made in view of the above problem. Specifically, an object of the present invention is to provide methods for authentication between apparatuses using a challenge and response system with improved security against spoofing, even when the same piece of challenge data that is used in a past authentication is reused.

A method for authentication between apparatuses using a challenge and response system according to the present invention is a method for authentication using a challenge and response system between a first apparatus and a second apparatus, the first apparatus having a first converting unit that performs a first conversion, the second apparatus having a second converting unit that performs a second conversion, a relation between the first conversion and the second conversion being identical or reverse, the method comprising: an authenticating step of sending a piece of challenge data from the first apparatus to the second apparatus, sending a piece of response data from the second apparatus to the first apparatus, the piece of response data having been converted from the piece of challenge data by the second conversion, judging in the first apparatus, based on the first conversion, whether the piece of response data is converted from the piece of challenge data by the second conversion, and authenticating the second apparatus if a result of the judgment is affirmative; and a setting step of, when the result of the judgment in the authenticating step is affirmative, setting a first conversion and a second conversion to be used in a next authentication, instead of the first conversion and the second conversion used in a current authentication, respectively, a content of the first conversion and the second conversion for the next authentication being different from a content of the first conversion and the second conversion used in the current authentication, and a relation between the first conversion and the second conversion for the next authentication being the same as the relation between the first conversion and the second conversion used in the current authentication.

According to the above method of authentication, every time the result of judgment is affirmative, i.e., every time an authentication succeeds, a first conversion and a second conversion having a different content from the current conversions are set to be used in the next authentication instead of the first and the second conversions used in the current authentication. By employing such a method, the first and the second conversions to be used in the next authentication is not necessarily the same as a first and a second conversions that were used in the past, and therefore, even when the past piece of challenge data is reused, the piece of response data is not necessarily the same as before.

Therefore, the method of authentication according to the present invention can improve the security against spoofing that eavesdrops and stores the sets of a piece of challenge data and a piece of response data.

A method of authentication according to the present invention can also be the above method for authentication, wherein in the setting step, when the result of the judgment in the authenticating step is negative, the first conversion and the second conversion used in the current authentication are set to be used in the next authentication.

According to the above method of authentication, when the result of judgment is negative, i.e., when the authentication is a failure, the first and the second conversions used in the current authentication are used for the next authentication again. Accordingly, the relation between the first and the second conversions remain identical or reverse.

Therefore, the first apparatus can authenticate the second apparatus normally in the next authentication.

This is especially effective in a case which the authentication is performed between the first apparatus and an unauthorized apparatus. If the first conversion is set to be renewed even when the authentication is a failure, for example, it is possible that, after the authentication process between the unauthorized apparatus is done, the first conversion in the first apparatus is renewed whereas the second conversion in the second apparatus is not renewed. In such a case, a special step must be taken in order to keep the relation between the first and the second conversion, such as a steps in which the first apparatus notifies the second apparatus of the first conversion and then the second apparatus renew the second conversion upon the notification. If the first and the second conversions are not renewed when the authentication is a failure, such a special step is not necessary.

A first apparatus according to the present invention is such that a first apparatus for authenticating a second apparatus using a challenge and response system, a relation between a first conversion and a second conversion being identical or reverse, the first apparatus comprising: an authenticating unit operable to send a piece of challenge data to the second apparatus, receive a piece of response data from the second apparatus, the piece of response data having been converted from the piece of challenge data by the second conversion, judge based on the first conversion whether the piece of response data is converted from the piece of challenge data by the second conversion, and authenticate the second apparatus if a result of the judgment is affirmative; and a setting unit operable to, when the result of the judgment in the authenticating unit is affirmative, set a first conversion to be used in a next authentication, instead of the first conversion used in the current authentication, a content of the first conversion for the next authentication being different from a content of the first conversion used in the current authentication, and a relation between the first conversion and a second conversion for the next authentication being the same as the relation between the first conversion and the second conversion used in the current authentication.

According to the above first apparatus of the present invention, every time the result of judgment is affirmative, i.e., every time an authentication succeeds, a first conversion having a different content from the current first conversion is set to be used in the next authentication instead of the first conversion used in the current authentication. By employing such a method, the first conversion in the next authentication is not necessarily the same as a first conversion that is used in the past, and therefore, even when the past piece of challenge data is reused, the piece of response data is not necessarily the same as before.

Therefore, the first apparatus according to the present invention can improve the security against spoofing that eavesdrops and stores the sets of a piece of challenge data and a piece of response data.

A first apparatus according to the present invention can also be the above first apparatus, wherein the setting unit sets the first conversion used in the current authentication process to be used in the next authentication process, when the result of the judgment in the authenticating unit is negative.

According to the above first apparatus, when the result of judgment is negative, i.e., when the authentication is a failure, the first conversion used in the current authentication is used for the next authentication again. Accordingly, the relation between the first and the second conversions remain identical or reverse.

Therefore, the first apparatus can authenticate the second apparatus normally in the next authentication.

This is especially effective in a case in which the authentication is performed between the first apparatus and an unauthorized apparatus. If the first conversion is set to be renewed even when the authentication is a failure, for example, it is possible that, after the authentication process between the unauthorized apparatus is done, the first conversion in the first apparatus is renewed whereas the second conversion in the second apparatus is not renewed. In such a case, a special step must be taken in order to keep the relation between the first and the second conversion, such as a steps in which the first apparatus notifies the second apparatus of the first conversion and then the second apparatus renew the second conversion upon the notification. If the first and the second conversions are not renewed when the authentication is a failure, such a special step is not necessary.

A first apparatus according to the present invention can also be the above first apparatus, wherein the first conversion and the second conversion are based on an identical parameter assigned to both the first conversion and the second conversion, and the setting unit obtains a parameter to be used in the next authentication when the result of the judgment in the authenticating unit is affirmative, by performing a predetermined operation on the parameter currently used, the predetermined operation is stored both in the first apparatus and the second apparatus in advance.

According to the above first apparatus, the first conversion and the second conversion each are based on the identical parameter. In other words, when the parameter is renewed, both the first and the second conversions are renewed.

Further, according to the above first apparatus, the first apparatus can obtain a parameter to be used in the next authentication by performing the same operation on the parameter currently used as the operation performed in the second apparatus. Therefore, if the parameters currently stored in the first and the second apparatuses are identical, the parameters after renewal are also identical.

Therefore, the first apparatus can keep the relation between the first and the second conversions identical or reverse, even after the renewal.

A first apparatus according to the present invention can also be the above first apparatus, wherein the setting unit sets the parameter to an initial value assigned to both the first apparatus and the second apparatus in advance, when the result of the judgment in the setting unit is negative.

According to the above first apparatus, when the result of judgment is negative, the first apparatus sets the parameter to an initial value assigned to both the first apparatus and the second apparatus in advance.

By the above first apparatus and with the second apparatus having the same construction, the parameter in both the first and the second apparatus are set to the initial value, even when the parameters in the first apparatus and the second apparatus become different.

Therefore, even when the first conversion and the second conversion become completely different, the first apparatus according to the present invention can restore the original relation between the first and the second conversions: i.e. identical or reverse.

A first apparatus according to the present invention can also be the above first apparatus, wherein the setting unit further comprises: a parameter information obtaining unit operable to obtain predetermined parameter information; and a parameter information sending unit operable to send the predetermined parameter information to the second apparatus when the result of the judgment in the authenticating unit is negative, and wherein the setting unit obtains the parameter to be used in the next authentication by performing the predetermined operation on the predetermined parameter information.

According to the above first apparatus, the first apparatus can obtain the parameter to be used in the next authentication by performing the predetermined operation on the obtained predetermined parameter information, and the predetermined operation is the same as the operation performed in the second apparatus.

Accordingly, the identical parameter is assigned to both the first apparatus and the second apparatus, if the second apparatus has the same construction as the first apparatus.

Therefore, even when the first conversion and the second conversion become completely different, the first apparatus according to the present invention can restore the original relation between the first and the second conversions: i.e. identical or reverse.

A first apparatus according to the present invention can also be the above first apparatus, wherein the relation between the first conversion and the second conversion is reverse, and the authenticating unit comprises: a challenge data generating unit operable to generate the piece of challenge data by performing the first conversion on a generated random number; a challenge data sending unit operable to send the piece of challenge data to the second apparatus; and a response data receiving unit operable to receive the piece of response data from the second apparatus, the piece of response data being converted from the piece of challenge data by the second conversion, the authenticating unit judging that the piece of response data is generated by performing the second conversion on the piece of challenge data, when the piece of response data received by the response data receiving unit is identical to the random number.

According to the above first apparatus, the piece of challenge data is the random number converted by the first conversion, and the piece of response data is the piece of challenge data converted by the second conversion. Because the relation between the first conversion and the second conversion is reverse, the piece of response data is identical to the random number.

Therefore, the first apparatus judges whether or not to authenticate the second apparatus by determining if the piece of response data and the random number are identical.

A first apparatus according to the present invention can also be the above first apparatus, wherein the relation between the first conversion and the second conversion is identical, and the authenticating unit comprising: a random number generating unit operable to generate a random number; a challenge data sending unit operable to send the random number as the piece of challenge data to the second apparatus; a response data receiving unit operable to receive the piece of response data from the second apparatus, the piece of response data being converted from the piece of challenge data by the second conversion; and a challenge data converting unit operable to perform the first operation on the random number, and wherein the authenticating unit judges that the piece of response data is generated by performing the second conversion on the piece of challenge data, when the piece of response data received by the response data receiving unit is identical to the random number converted by the challenge data converting unit.

According to the above first apparatus, the first apparatus receives the piece of response data which is the piece of challenge data converted by the second conversion in the second apparatus. Further, the first apparatus performs the first conversion on the piece of challenge data. Note that the relation between the first and the second conversions here are identical.

Accordingly, the first apparatus judges whether or not to authenticate the second apparatus by determining if the piece of response data and the piece of challenge data converted in the first apparatus are identical.

A second apparatus according to the present invention is such that a second apparatus for being authenticated by a first apparatus using a challenge and response system, a relation between a first conversion and a second conversion being identical or reverse, the second apparatus comprising: a challenge data receiving unit operable to receive a piece of challenge data sent from the first apparatus; a response data generating unit operable to generate a piece of response data by performing the second conversion on the piece of challenge data received by the challenge data receiving unit; a response data sending unit operable to send the piece of response data generated by the response data generating unit to the first apparatus; and a setting unit operable to, after performing the second conversion in the response data generating unit, set a second conversion to be used in a next authentication instead of the second conversion used in the current authentication, a content of the second conversion for the next authentication being different from a content of the second conversion used in the current authentication, and a relation between a first conversion and the second conversion for the next authentication being the same as the relation between the first conversion and the second conversion used in the current authentication.

According to the above second apparatus of the present invention, the second apparatus generates the piece of response data by performing the second conversion on the piece of challenge data, and sets a second conversion with different content from the current second conversion instead of the second conversion used in the current authentication. By employing such a second apparatus, the second conversion to be used in the next authentication is not necessarily the same as a conversion that is used in the past, and therefore, even when the past piece of challenge data is reused, the piece of response data is not necessarily the same as before.

Therefore, the second apparatus according to the present invention can improve the security against spoofing that eavesdrops and stores the sets of a piece of challenge data and a piece of response data.

A second apparatus according to the present invention can also be the above second apparatus, wherein the setting unit sets the second conversion to be used in the next authentication instead of the second conversion used in the current authentication when the second apparatus is notified of an affirmative result from the first apparatus after the first apparatus judges based on the first conversion if the piece of response data is converted from the piece of challenge data by the second conversion, the content of the second conversion for the next authentication being different from the content of the second conversion used in the current authentication.

According to the above method second apparatus, the second apparatus sets a second conversion to be used in the next conversion, instead of the second conversion used in the current authentication, when the second apparatus is notified that the result of judgment in the first apparatus is affirmative.

In order that the second apparatus is authenticated by the first apparatus, the second conversion is required to be in an identical or reverse relation to the first conversion. In other words, if the first apparatus is such that the first conversion to be used in the next authentication is set instead of the first conversion used in the current authentication when the result of judgment is affirmative, the second conversion in the second apparatus must be set accordingly. It is possible to keep the relation between the first conversion and the second conversion identical or reverse by employing the second apparatus that sets a second conversion to be used in the next conversion instead of the second conversion used in the current authentication when the second apparatus is notified that the result of judgment in the first apparatus is affirmative.

A second apparatus according to the present invention can also be the above second apparatus, wherein the first conversion and the second conversion are based on an identical parameter assigned to both the first conversion and the second conversion, and the setting unit further sets the parameter to an initial value assigned to both the first apparatus and the second apparatus in advance, when the second apparatus is notified of an affirmative result by the first apparatus after the first apparatus judges based on the first conversion if the piece of response data is converted from the piece of challenge data by the second conversion.

According to the above second apparatus, the second apparatus sets the parameter to an initial value assigned to both the first apparatus and the second apparatus in advance.

By the above second apparatus, if the first apparatus having the same construction, the parameter in both the first and the second apparatus are set to the initial value, even when the parameters in the first apparatus and the second apparatus become different.

Therefore, even when the first conversion and the second conversion become completely different, the second apparatus according to the present invention can restore the original relation between the first and the second conversions: i.e. identical or reverse.

A second apparatus according to the present invention can also be the above second apparatus, wherein the setting unit further comprises: a parameter information obtaining unit for obtaining predetermined parameter information, when the result of the judgment is negative and the predetermined parameter information is sent from the first apparatus, and wherein the setting unit obtains a parameter to be used in the next authentication by performing the predetermined operation on the predetermined parameter information, and the predetermined operation is stored both in the first apparatus and the second apparatus in advance.

According to the above second apparatus, the second apparatus can obtain the parameter to be used in the next authentication by performing the predetermined operation on the obtained predetermined parameter information, and the predetermined operation is the same as the operation performed in the first apparatus.

Accordingly, the identical parameter is assigned to both the first apparatus and the second apparatus, if the first apparatus has the same construction as the second apparatus.

Therefore, even when the first conversion and the second conversion become completely different, the second apparatus according to the present invention can restore the original relation between the first and the second conversions: i.e. identical or reverse.

An authentication system according to the present invention is such that an authentication system using a challenge and response system between a first apparatus and a second apparatus, a relation between a first conversion and a second conversion being identical or reverse, the authentication system comprising: an authenticating unit operable to send a piece of challenge data from the first apparatus to the second apparatus, send a piece of response data from the second apparatus to the first apparatus, the piece of response data having been converted from the piece of challenge data by the second conversion, judge in the first apparatus, based on the first conversion, whether the piece of response data is converted from the piece of challenge data by the second conversion, and authenticate the second apparatus if a result of the judgment is affirmative; and a setting unit operable to, when the result of the judgment in the authenticating unit is affirmative, set a first conversion and a second conversion to be used in a next authentication, instead of the first conversion and the second conversion used in the current authentication, respectively, a content of the first conversion and the second conversion for the next authentication being different from a content of the first conversion and the second conversion used in the current authentication, and a relation between the first conversion and the second conversion for the next authentication being the same as the relation between the first conversion and the second conversion used in the current authentication.

According to the above authentication system, every time the result of judgment is affirmative, i.e., every time an authentication succeeds, a first conversion and a second conversion having a different content from the current conversions are set to be used in the next authentication instead of the first and the second conversions used in the current authentication. By employing such a system, the first and the second conversions to be used in the next authentication is not necessarily the same as a first and a second conversions that were used in the past, and therefore, even when the past piece of challenge data is reused, the piece of response data is not necessarily the same as before.

Therefore, the authentication system according to the present invention can improve the security against spoofing that eavesdrops and stores the sets of a piece of challenge data and a piece of response data.

A keyless entry system according to the present invention is such that a keyless entry system using a challenge and response system between an in-vehicle unit and a remote controller, a relation between a first conversion and a second conversion being identical or reverse, the keyless entry system comprising: an authenticating unit operable to send a piece of challenge data from the in-vehicle unit to the remote controller, send a piece of response data from the remote controller to the in-vehicle unit, the piece of response data having been converted from the piece of challenge data by the second conversion, judge in the in-vehicle unit, based on the first conversion, whether the piece of response data is converted from the piece of challenge data by the second conversion, and authenticate the remote controller if a result of the judgment is affirmative; and a setting unit operable to, when the result of the judgment in the authenticating unit is affirmative, set a first conversion and a second conversion to be used in a next authentication, instead of the first conversion and the second conversion used in the current authentication, respectively, a content of the first conversion and the second conversion for the next authentication being different from a content of the first conversion and the second conversion used in the current authentication, and a relation between the first conversion and the second conversion for the next authentication being the same as the relation between the first conversion and the second conversion used in the current authentication.

According to the above keyless entry system, every time the result of judgment is affirmative, i.e., every time an authentication succeeds, a first conversion and a second conversion having a different content from the current conversions are set to be used in the next authentication instead of the first and the second conversions used in the current authentication. By employing such a system, the first and the second conversions to be used in the next authentication is not necessarily the same as a first and a second conversions that were used in the past, and therefore, even when the past piece of challenge data is reused, the piece of response data is not necessarily the same as before.

Therefore, the keyless entry system according to the present invention can improve the security against spoofing that eavesdrops and stores the sets of a piece of challenge data and a piece of response data.

A vehicle according to the present invention is such that a vehicle equipped with a keyless entry system using a challenge and response system between an in-vehicle unit and a remote controller, a relation between a first conversion and a second conversion being identical or reverse, the keyless entry system comprising: an authenticating unit operable to send a piece of challenge data from the in-vehicle unit to the remote controller, send a piece of response data from the remote controller to the in-vehicle unit, the piece of response data having been converted from the piece of challenge data by the second conversion, judge in the in-vehicle unit, based on the first conversion, whether the piece of response data is converted from the piece of challenge data by the second conversion, and authenticate the remote controller if a result of the judgment is affirmative; and a setting unit operable to, when the result of the judgment in the authenticating unit is affirmative, set a first conversion and a second conversion to be used in a next authentication, instead of the first conversion and the second conversion used in the current authentication respectively, a content of the first conversion and the second conversion for the next authentication being different from a content of the first conversion and the second conversion used in the current authentication, and a relation between the first conversion and the second conversion for the next authentication being the same as the relation between the first conversion and the second conversion used in the current authentication.

According to the above vehicle, every time the result of judgment is affirmative, i.e., every time an authentication succeeds, a first conversion and a second conversion having a different content from the current conversions are set to be used in the next authentication instead of the first and the second conversions used in the current authentication. By employing such a vehicle, the first and the second conversions to be used in the next authentication is not necessarily the same as a first and a second conversions that were used in the past, and therefore, even when the past piece of challenge data is reused, the piece of response data is not necessarily the same as before.

Therefore, the vehicle according to the present invention can improve the security against spoofing that eavesdrops and stores the sets of a piece of challenge data and a piece of response data.

BRIEF DESCRIPTION OF THE DRAWINGS

These and the other objects, advantages and features of the invention will become apparent from the following description thereof taken in conjunction with the accompanying drawings which illustrate a specific embodiment of the invention.

In the drawings.

DESCRIPTION OF THE PREFERRED EMBODIMENTS

The following describes methods for authentication between apparatuses using a challenge and response system according to preferred embodiments of the present invention.

First Embodiment

[Outline]

In the present embodiment, a piece of challenge data is generated by encrypting a random number based on a parameter, and a piece of response data is generated by decrypting the piece of challenge data based on the same parameter. The parameter is assigned to both a server and a terminal in advance, and is renewed every time an authentication process is successfully completed. In other words, the parameter has been and is renewed in both past and current authentication processes, and accordingly, the piece of response data to be generated in a next authentication process will not necessarily be the same as the past piece of response data even when the same piece of challenge data is used. By the above method, a degree of security is improved against spoofing that eavesdrops and stores the sets of a piece of challenge data and a piece of response data.

[Construction]

Figure 1:
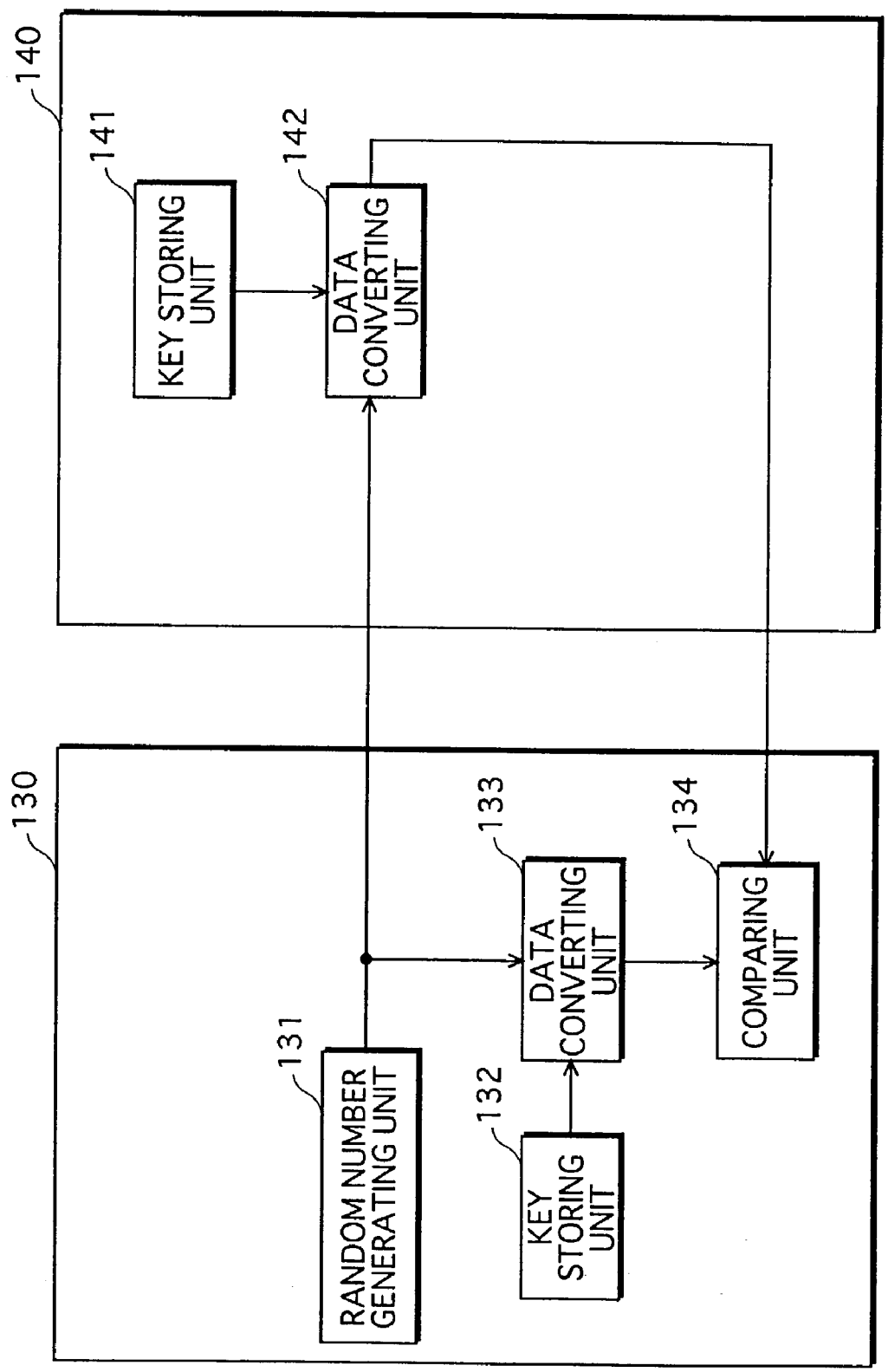
FIG. 1 shows a construction of a server and a terminal to realize a common authentication method using a challenge and response system.
Figure 2:
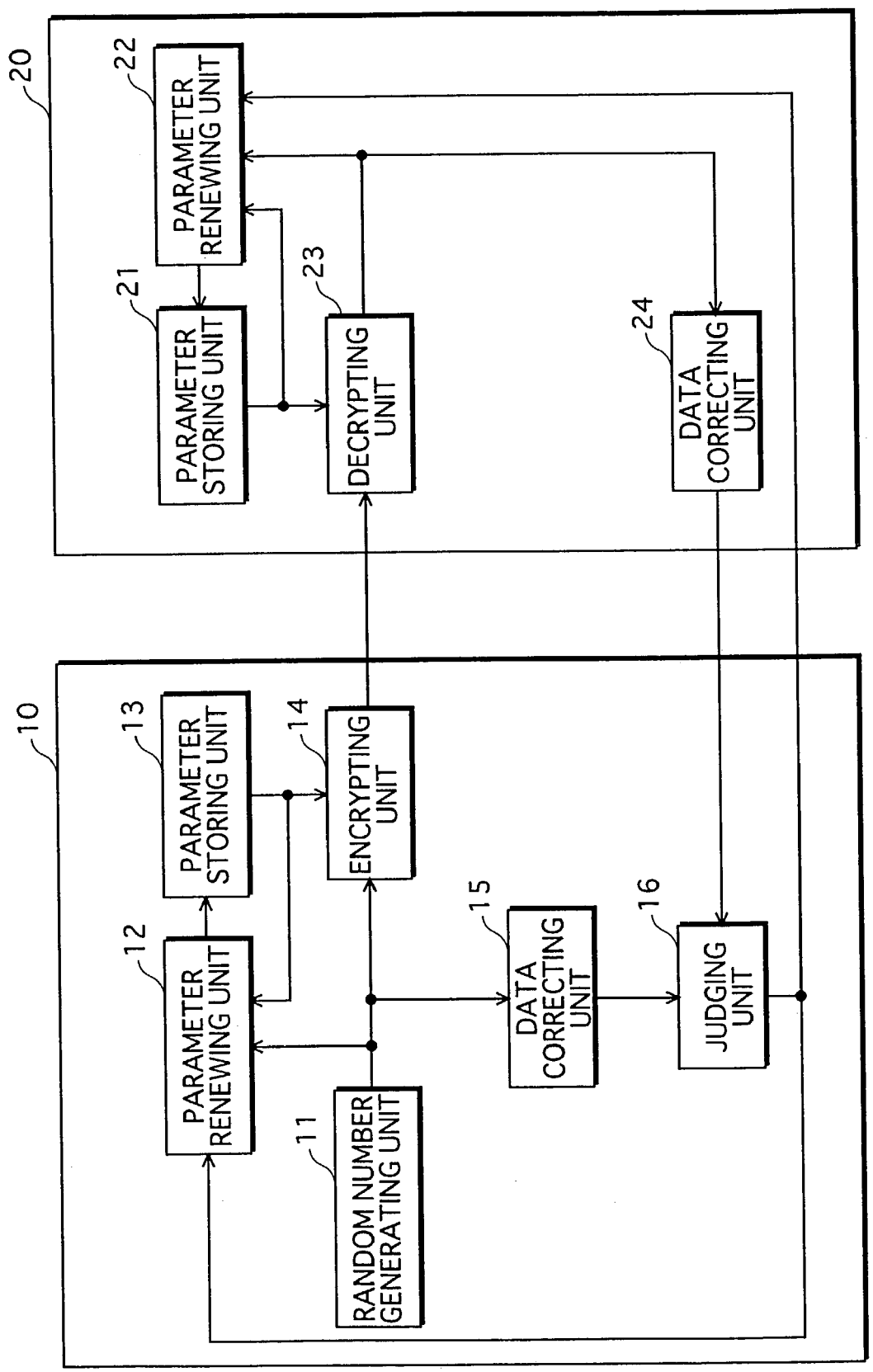
FIG. 2 shows a construction of a server and a terminal to realize an authentication method using a challenge and response system according to First Embodiment.

FIG. 2 shows a construction of the server and the terminal to realize an authentication method using a challenge and response system according to First Embodiment.

A server 10 comprises a random number generating unit 11, a parameter renewing unit 12, a parameter storing unit 13, an encrypting unit 14, a data correcting unit 15, and a judging unit 16.

The server 10 executes an authentication process upon an access request from a terminal 20.

The random number generating unit 11 generates a 64-bit random number R in each authentication process. The random number R generated here is input to each of the parameter renewing unit 12, the encrypting unit 14, and the data correcting unit 15.

The parameter renewing unit 12 renews a 56-bit parameter K [i] stored in the parameter storing unit 13 to a 56-bit parameter K [i+1] every time an authentication process succeeds. Note that the status i (i=0,1,2 . . . ) indicates the status when the parameter is renewed i times from an initial status (i=0). Specifically, the parameter K [i+1] is derived by a following operation.

$$K[i+1]=Rot8(K[i](+)T)$$

In this operation, K[i] is a 56-bit parameter stored in the parameter storing unit 13, and T is a 56-bit data with high 48 bits are 0 and low 8 bits are taken from low 8 bits of the random number R. Further, (+) is a bitwise exclusive-or operation (hereinafter referred to as XOR operation), and the Rot8(X) indicates an operation in which data X is rotated upward by 8 bits.

The parameter storing unit 13 stores an initial parameter K [0] and the parameter K [i]. The parameter K [i] is set as a parameter to be used in a next authentication process, by renewing the initial parameter K [0] i times at the parameter renewing unit 12. Also, the parameter K [0] is secretly pre-assigned to both the server 10 and the terminal 20. Such pre-assignment of the parameter K [0] can be done in such a way that the server 10 issues the parameter K [0] to a user of the terminal 20 when the server 10 initially authorizes the terminal 20, and the user sets the parameter K [0] in the terminal 20.

The encrypting unit 14 derives the piece of challenge data C and sends the piece of challenge data C to the terminal 20. The piece of challenge data C is derived by encrypting the random number R using the parameter K [i] stored in the parameter storing unit 13 as follows.

$$C=Enc(K[i],R)$$

In this operation, Enc(X,Y) indicates an operation in which a 64-bit data is derived by encrypting the 64-bit data Y using the 56-bit parameter X.

As a method of encryption, Data Encryption Standard (DES) is employed.

The data correcting unit 15 generates a 56-bit data S out of the 64-bit data. Specifically, the 56-bit data S is derived by truncating low 8 bits from the 64-bit data. The data S generated here is input to the judging unit 16.

The judging unit 16 compares the data S from the data correcting unit 15 and the piece of 56-bit response data Q received from the terminal 20, and judges if the two data are identical.

The server 10 authenticates the terminal 20 being an authorized user when the data S and the piece of response data Q are identical; and when the two pieces of data are not identical, the server 10 does not authenticate the terminal 20.

In addition, the judging unit 16 notifies the parameter renewing unit 12 and a parameter renewing unit 22 that the terminal 20 is authenticated.

The terminal 20 comprises a parameter storing unit 21, the parameter renewing unit 22, a decrypting unit 23, and a data correcting unit 24.

The parameter storing unit 21, as with the parameter storing unit 13, stores the initial parameter K [0] and the parameter K [i]. The parameter K [i] is set as a parameter to be used in the next authentication process, by renewing the initial parameter K [0] i times at the parameter renewing unit 22. Also, the parameter K [0] is secretly pre-assigned to both the server 10 and the terminal 20.

The parameter renewing unit 22, as with the parameter renewing unit 12, renews a 56-bit parameter K [i] stored in the parameter storing unit 21 to a 56-bit parameter K [i+1] every time an authentication process succeeds. Specifically, the parameter K [i+1] is derived by a following operation.

$$K[i+1]=Rot8(K[i](+)U)$$

In this operation, K[i] is a 56-bit parameter K [i] stored in the parameter storing unit 21, and U is a 56-bit data with high 48 bits are 0 and low 8 bits are taken from low 8 bits of a decrypted random number P. Further, (+) is an exclusive-or operation per bit, and Rot8(X) indicates an operation in which data X is rotated upward by 8 bits.

The decrypting unit 23 receives the piece of challenge data C from the server 10 and generates the decrypted random number P. The decrypted random number P is generated by decrypting the piece of challenge data C using the parameter K [i] stored in the parameter storing unit 21 as follows.

$$P=Dec(K[i],C)$$

In this operation, Dec(X,Y) indicates an operation in which a 64-bit data is derived by decrypting the 64-bit data Y using the 56-bit parameter X.

As the method of decryption, DES is employed. Thus, Enc(X,Y) and Dec(X,Y) have a following relation, taking A as any 64-bit data and B as any 56-bit data.

$$A=Dec(B,Enc(B,A))$$

By the above relation, the decrypted random number P becomes identical to the random number R.

The data correcting unit 24, as with the data correcting unit 15, generates a 56-bit data out of the 64-bit data. Specifically, the 56-bit data is derived by truncating low 8 bits from the 64-bit data. The data generated here is sent to the server as a piece of response data.

According to the above construction, because the random number R and the decrypted random number P are identical, the data T and U becomes identical. Also, K [i] is assigned to both the server 10 and the terminal 20 in advance. Thus, the server 10 and the terminal 20 both hold the identical K [i+1].

Details in the construction of the parameter renewing units 12 and 22 are given below.

Figure 3:
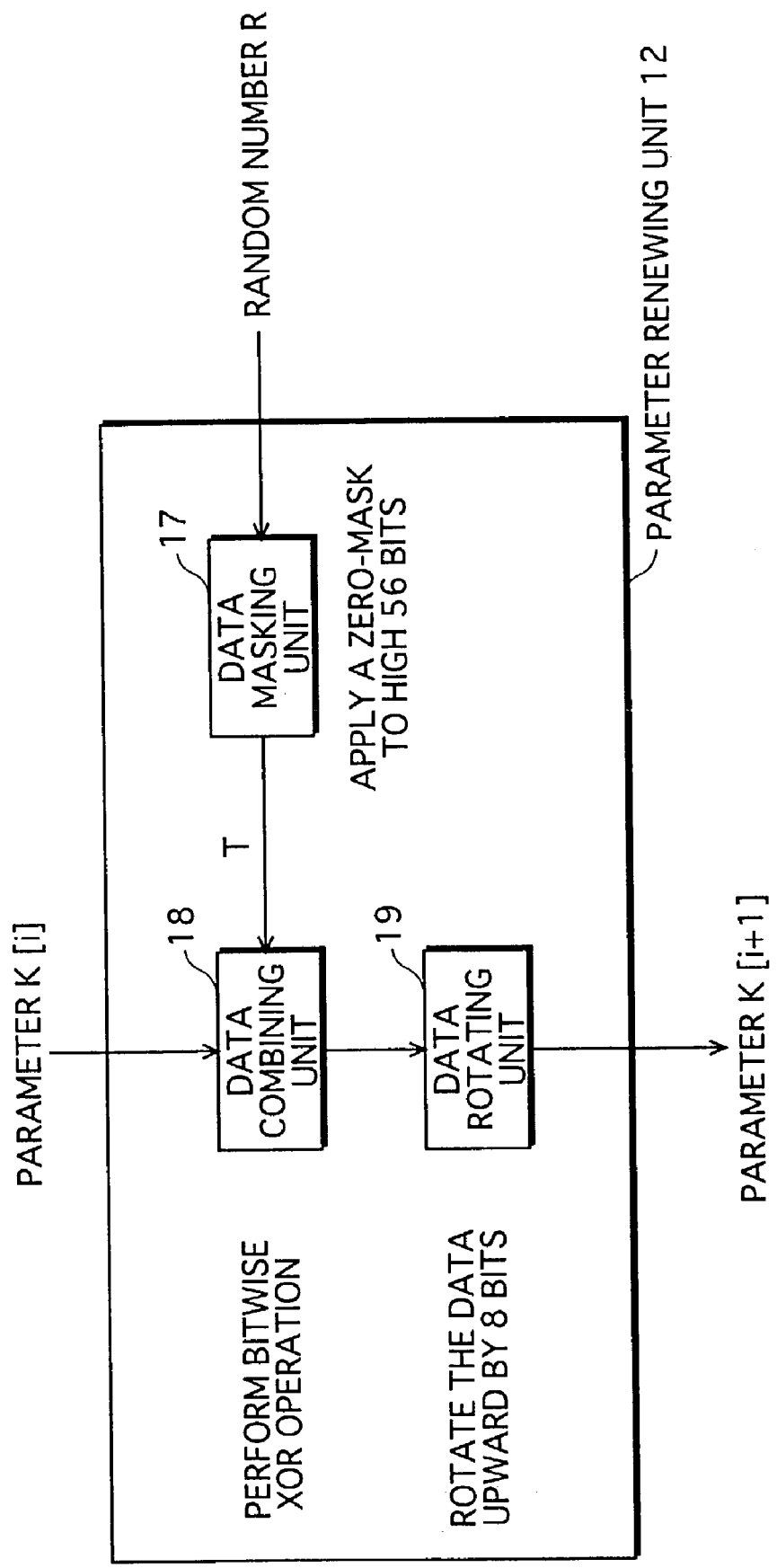
FIG. 3 shows a construction of a parameter renewing unit 12.

FIG. 3 shows a construction of the parameter renewing unit 12.

The parameter renewing unit 12 comprises a data masking unit 17, a data combining unit 18, and a data rotating unit 19, for renewing the parameter K [i] to the parameter K [i+1].

The data masking unit 17 applies a zero-mask to high 56 bits of the random number R, takes low 56 bits of this result as the data T, and sends the data T to the data combining unit 18. The random number R is a random number generated by the random number generating unit 11 in the status i.

The data combining unit 18 performs a bitwise XOR operation between the 56-bit parameter K [i] and the 56-bit data T, and outputs a result to the data rotating unit 19.

The data rotating unit 19 rotates the data from the data combining unit 18 upward by 8 bits, and outputs a result as the parameter K [i+1].

By the above construction, the parameter renewing unit 12 can perform a following operation.

$$K[i+1]=Rot8(K[i](+)T)$$

The parameter renewing unit 22 has a substantially same construction as the parameter renewing unit 12, and is different only in that the decrypted random number P, instead of the random number R, is input to the parameter renewing unit 22.

As shown in the above, because the construction of the parameter renewing units 12 and 22 are substantially the same, parameter renewing units 12 and 22 both can renew the parameter K [i] to the parameter K [i+1], if the random number R and the decrypted random number P are identical.

[Operation]

An explanation about an operation in the server 10 authenticates the terminal 20 in the status i is given below. In the explanation, the server 10 and the terminal 20 each hold the identical parameter K [0] in the initial status, and the parameter K [i] in the status i.

Figure 4:
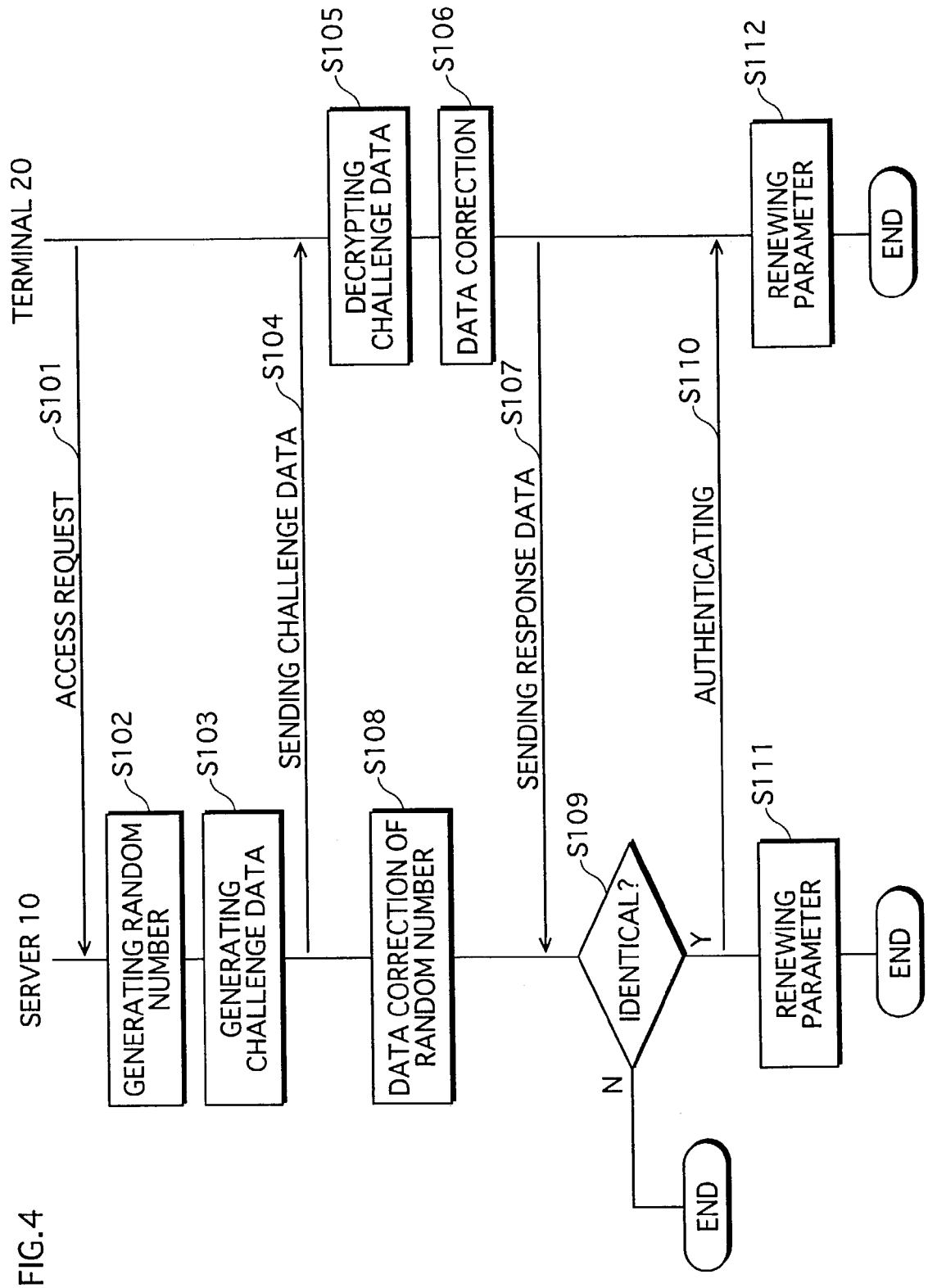
FIG. 4 shows an operation of the server and the terminal to realize the authentication method using a challenge and response system according to First Embodiment.

FIG. 4 shows the operation of the server and the terminal to realize the authentication method using a challenge and response system according to First Embodiment First of all, the terminal 20 sends an access request to the server 10 (S101).

Upon the access request from the terminal 20, the server 10 starts an authentication process to identify if the terminal 20 is authorized. First, the server 10 generates the 64-bit random number R at the random number generating unit 11 (S102).

Then, the server 10 generates the piece of challenge data C by encrypting the random number R as follows at the encrypting unit 14, using the parameter K [i] stored in the parameter storing unit 13 (S103).

$$C=Enc(K[i],R)$$

Then, the server 10 sends the piece of challenge data C to the terminal 20 (S104).

The terminal 20 receives the piece of challenge data C from the server 10. The terminal 20 derives the decrypted random number P by decrypting the piece of challenge data C as follows at the decrypting unit 23, using the parameter K [i] stored in the parameter storing unit 21 (S105).

$$P=Dec(K[i],C)$$

Next, the terminal 20 generates the 56-bit data by truncating low 8 bits from the 64-bit decrypted random number P at the data correcting unit 24 (S106).

Then, the terminal 20 sends the 56-bit data generated in S106 to the server 10 as the piece of response data Q (S107).

On the other hand, the sever 10 generates the 56-bit data S by truncating low 8 bits from the 64-bit random number R generated in S102 (S108).

The server 10 inputs the piece of response data Q received in S107, and the data S generated in S108 into the judging unit 16. The judging unit 16 compares the two pieces of data to determine if the two pieces of data are identical (S109).

When the piece of response data Q and the data S are not identical in S109 (S109N), the server 10 determines that the terminal 20 is unauthorized, and terminates the authentication process. In this case, the status i is not renewed.

When the piece of response data Q and the data S are identical in S109 (S109Y), the server 10 authenticates the terminal 20. In this case, the server 10 notifies the terminal 20 that the authentication was successful (S110).

Then, the server 10 derives the parameter K [i+1] by the following operation at the parameter renewing unit 12.

$$K[i+1]=Rot8(K[i](+)T)$$

The server 10 replaces the parameter K [i] stored in the parameter storing unit 13 with the new parameter K [i+1], and sets the new parameter to be used in the next authentication process. (S111). By this operation, the status i increases by one.

Thus, the server 10 completes the authentication process.

Also, the terminal 20 derives the parameter K [i+1] by the following operation at the parameter renewing unit 22, after receiving the notification from the server 10 in S110.

$$K[i+1]=Rot8(K[i](+)U)$$

The terminal 20 replaces the parameter K [i] stored in the parameter storing unit 21 with the new parameter K [i+1], and sets the new parameter to be used in the next authentication process. (S112). By this operation, the status i increases by one.

Thus, the terminal 20 completes the authentication process.

In the present embodiment, the parameter K [i], which is secretly assigned to the server 10 and the terminal 20, is renewed to the parameter K [i+1] every time authentication succeeds. In other words, the parameter used in a past authentication process is not necessarily identical to the parameter for the current authentication process. Unless the parameters used in the past and the current authentication processes are identical, the relation between the piece of challenge data C and the piece of response data Q does not correspond each other. Therefore, by the present embodiment, it is possible to improve security against spoofing, which tries to pretend to be an authorized user by eavesdropping on the pieces of challenge data and the corresponding on pieces of response data and storing the sets of data as a data list.

Numeric evaluation of the present embodiment is as follows.

In the present embodiment, the parameter is a 56-bit data. This indicates that the parameter's number of cases is 2^(56) (2^(56) indicates 2 to the power of 56). Therefore, even when the same challenge data C that was used in the past authentication process is reused, the possibility of successful pretension is ½^(56) while the possibility is 1 in the case of a conventional example, and security is remarkably improved in comparison with the conventional example.

In some cases, the server and the terminal perform cryptographic communication after the successful authentication. In such cases, by employing the present embodiment, the encrypting unit and the decrypting unit used in the authentication process can also be used in the cryptographic communication.

Second Embodiment

[Outline]

In First Embodiment, the parameters are renewed by the operation Rot8(X). The present embodiment performs an operation having a greater degree of variation, which further improves security against spoofing by an unauthorized terminal.

[Construction]

Figure 5:
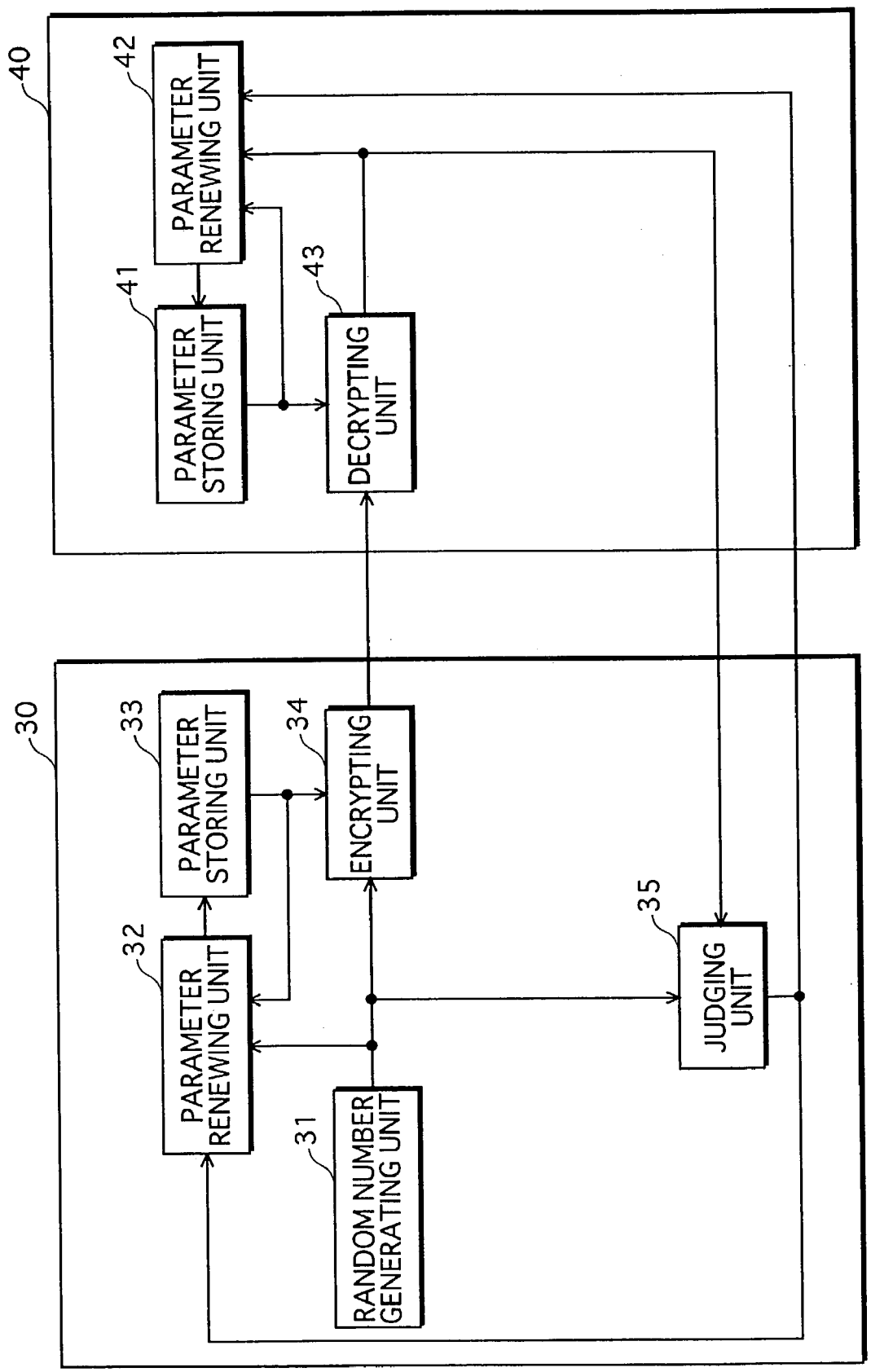
FIG. 5 shows a construction of a server and a terminal to realize an authentication method using a challenge and response system according to Second Embodiment.

FIG. 5 shows a construction of a server and a terminal to realize an authentication method using a challenge and response system according to Second Embodiment.

A server 30 comprises a random number generating unit 31, a parameter renewing unit 32, a parameter storing unit 33, an encrypting unit 34, and a judging unit 35. A terminal 40 comprises a parameter storing unit 41, a parameter renewing unit 42, and a decrypting unit 43.

The construction of the server 30 and the terminal 40 in the present embodiment is substantially the same as the server 10 and the terminal 20 in First Embodiment, and is only different in that the construction in the present embodiment does not include a data correcting unit. The data correcting unit is for deriving a 56-bit data by truncating low 8 bits from a 64-bit data. Accordingly, while the judging unit 16 in First Embodiment compares two 56-bit data, the judging unit 35 in the present embodiment compares two 64-bit data.

Further, an operation for renewing a parameter K [i] to a parameter K [i+1] at the parameter renewing units 32 and 42 in the present embodiment is different from the operation in First Embodiment.

Specifically, the parameter K [i+1] is derived by the following operation at the parameter renewing units 32.

$$K[i+1]=MSB56(Dec(K[i],R))$$

In this operation, K[i] is a 56-bit parameter K [i] stored in the parameter storing unit 33, and R is a 64-bit random number R generated at the random number generating unit 31. Further, MSB56(X) indicates an operation in which high 56 bits of data X is output.

The parameter K [i+1] is derived by the following operation at the parameter renewing unit 42.

$$K[i+1]=MSB56(Dec(K[i],P))$$

In this operation, K[i] is a 56-bit parameter K [i] stored in the parameter storing unit 41, and P is a 64-bit decrypted random number P decrypted at the decrypting unit 43. Further, MSB56(X) indicates an operation in which high 56 bits of data X is output.

Figure 6:
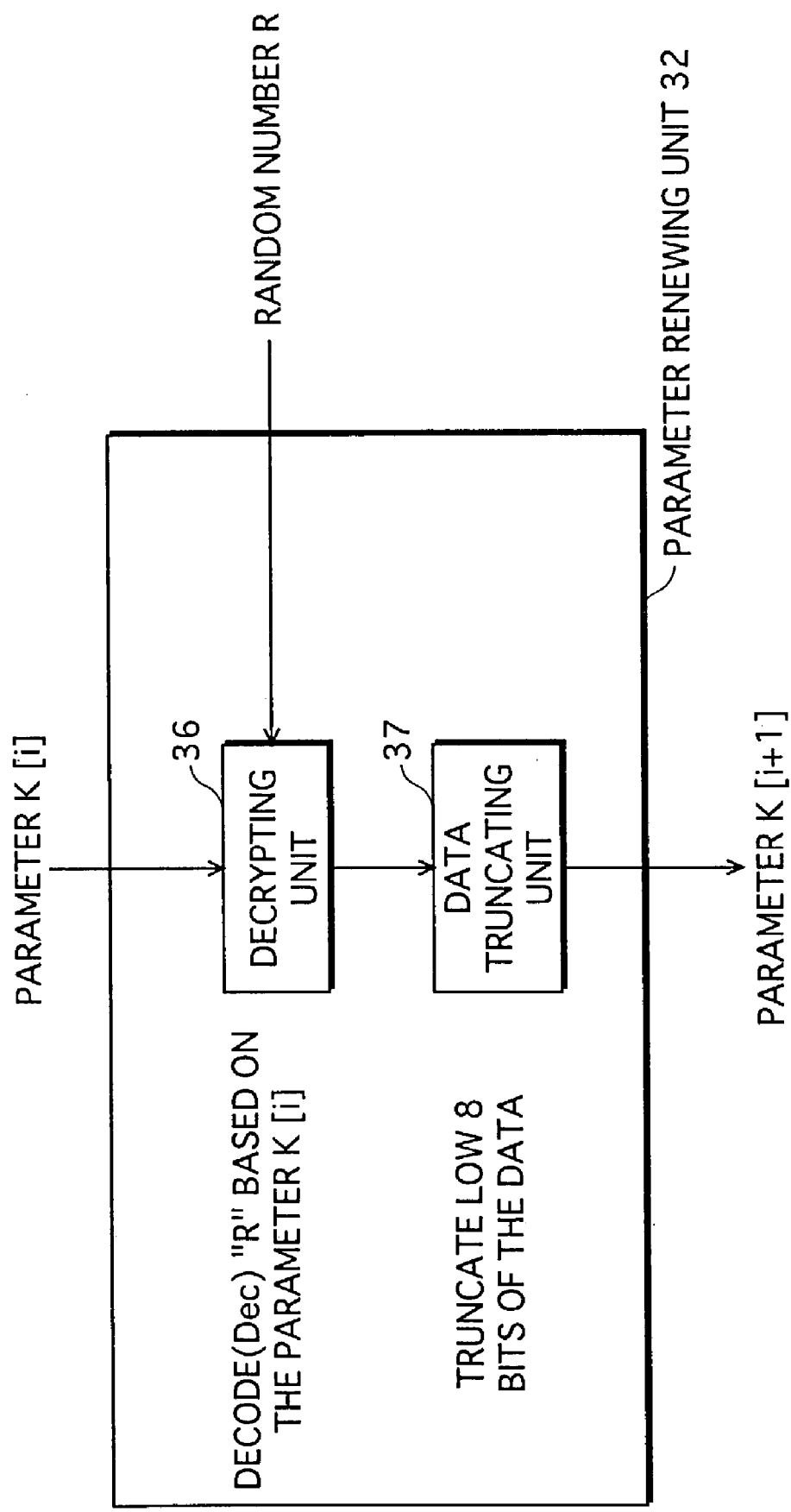
FIG. 6 shows a construction of a parameter renewing unit 32.

FIG. 6 shows a construction of a parameter renewing unit 32.

The data renewing unit 32 comprises a decrypting unit 36 and a data truncating unit 37, and for renewing the parameter K [i] to the parameter K [i+1] as described above.

The decrypting unit 36 decrypts the 64-bit random number R based on the parameter K [i], and outputs a 64-bit data as a result to the data truncating unit 37. The random number R is a random number generated at the random number generating unit 31 in the status i.

The data truncating unit 37 truncates low 8 bits from the 64-bit data, and outputs high 56 bits of the data as the parameter K [i].

By this, the parameter renewing unit 32 can perform the following operation.

$$K[i+1]=MSB56(Dec(K[i],R))$$

The parameter renewing unit 42 has a substantially same construction as the parameter renewing unit 32, and is only different in that the decrypting random data P, instead of random number R, is input in the parameter renewing unit 42.

As shown in the above, because the constructions of the parameter renewing units 32 and 42 are substantially the same, both parameter renewing units 32 and 42 can renew the parameter K [i] to the parameter K [i+1], if the random number R and the decrypted random number P are identical.

The construction of other units in the present embodiment is the same as First Embodiment, and therefore an explanation is not given here.

[Operation]

An explanation about an operation in the server 30 authenticates the terminal 40 in the status i is given below. In the explanation, the server 30 and the terminal 40 each hold the identical parameter K [0] in the initial status, and the parameter K [i] in the status i.

Figure 7:
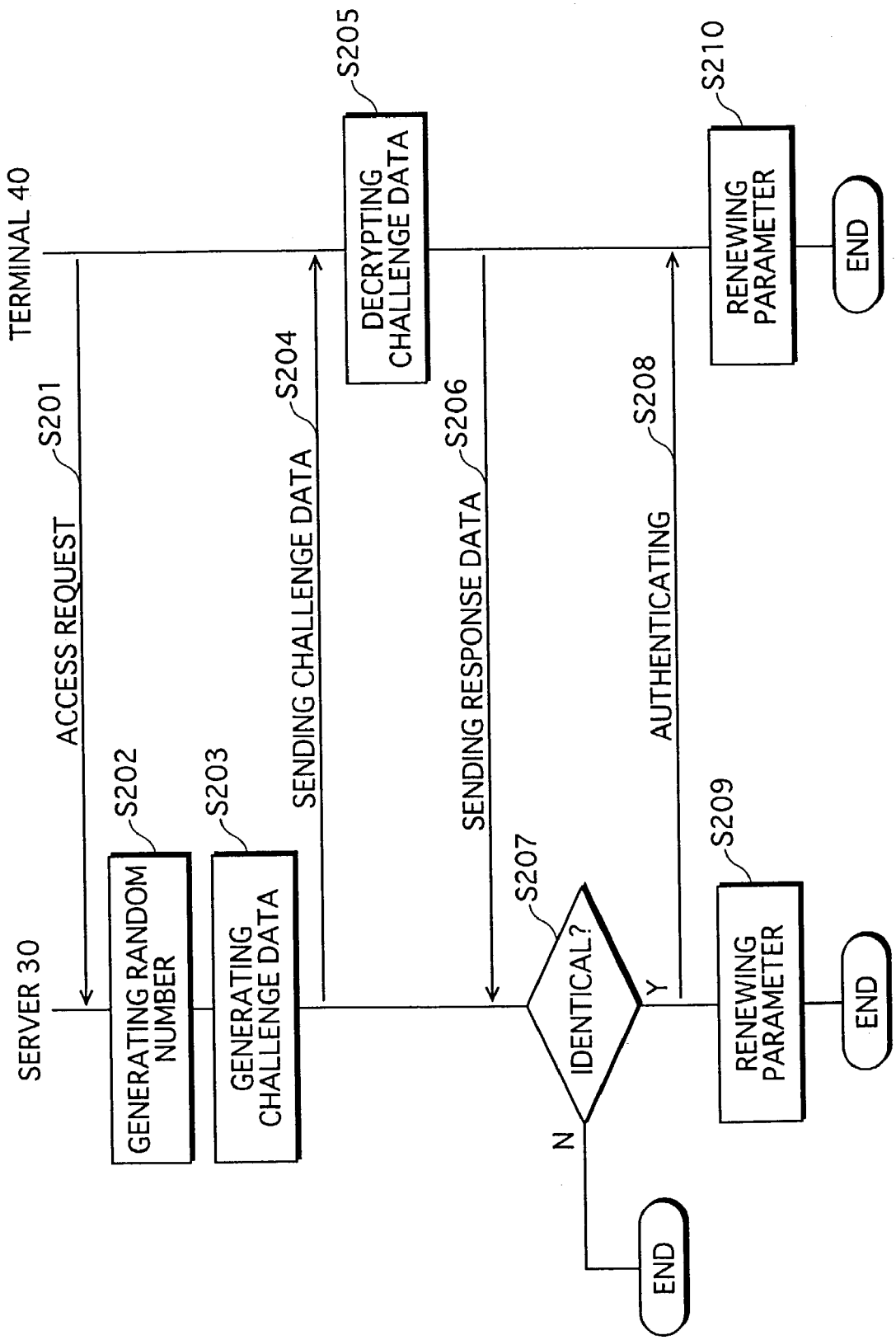
FIG. 7 shows an operation of the server and the terminal to realize the authentication method using a challenge and response system according to Second Embodiment.

FIG. 7 shows the operation of the server and the terminal to realize the authentication method using a challenge and response system according to Second Embodiment.

First of all, the terminal 40 sends an access request to the server 30 (S201).

Upon the access request from the terminal 40, the server 30 starts an authentication process to identify if the terminal 40 is authorized. First, the server 30 generates the 64-bit random number R at the random number generating unit 31 (S202).

Then, the server 30 generates the piece of challenge data C by encrypting the random number R as follows at the encrypting unit 34, using the parameter K [i] stored in the parameter storing unit 33 (S203).

$$C=Enc(K[i],R)$$

In this operation, Enc(X,Y) indicates an operation in which a 64-bit data is derived by encrypting the 64-bit data Y using the 56-bit parameter X.

As a method of encryption, DES is employed.

Then, the server 30 sends the challenge data C to the terminal 40 (S204).

The terminal 40 receives the piece of challenge data C from the server 30. The terminal 40 derives the decrypted random number P by decrypting the piece of challenge data C as follows at the decrypting unit 43, using the parameter K [i] stored in the parameter storing unit 41 (S205).

$$P=Dec(K[i],C)$$

In this operation, Dec(X,Y) indicates an operation in which a 64-bit data is derived by decrypting the 64-bit data Y using the 56-bit parameter X.

As the method of decryption, DES is employed.

Then, the terminal 40 sends the 64-bit data decrypted in S205 to the server 30 as the piece of response data Q (S206).

The server 30 inputs the piece of response data Q received in S206, and the random number R generated in S202 into the judging unit 35. The judging unit 35 compares the two pieces of data to determine if the two pieces of data are identical (S207).

When the piece of response data Q and the random number R are not identical in S207 (S207N), the server 30 determines that the terminal 40 is unauthorized, and terminates the authentication process. In this case, the status i is not renewed.

When the piece of response data Q and the random number R are identical in S207 (S207Y), the server 30 authenticates the terminal 40. In this case, the server 30 notifies the terminal 40 that the authentication was successful (S208).

Then, the server 30 derives the parameter K [i+1] by the following operation at the parameter renewing unit 32.

$$K[i+1]=MSB56(Dec(K[i],R))$$

The server 30 replaces the parameter K [i] stored in the parameter storing unit 33 with the new parameter K [i+1], and sets the new parameter to be used in the next authentication process. (S209). By this operation, the status i increases by one.

Thus, the server 30 completes the authentication process.

Also, the terminal 40 derives the parameter K [i+1] by the following operation at the parameter renewing unit 42, after receiving the notification from the server 30 in S208.

$$K[i+1]=MSB56(Dec(K[i],P))$$

The terminal 40 replaces the parameter K [i] stored in the parameter storing unit 41 with the new parameter K [i+1], and sets the new parameter to be used in the next authentication process. (S210) By this operation, the status i increases by one.

Thus, the terminal 40 completes the authentication process.

A number of steps required in the present embodiment becomes larger in comparison with First Embodiment, because the server 30 and the terminal 40 each are required to perform DES encryption two times in every authentication process. However, while the operation in First Embodiment for renewal of the parameter is Rot(X), a simple data rotation of a bit string, the operation performed in the present embodiment is Dec(X,Y), and a degree of variation from the parameter K [i] to the parameter K [i+1] becomes larger. Therefore, it is possible to further improve security by the present embodiment.

Third Embodiment

[Outline]

In First Embodiment, the authentication is performed by encrypting in the server and decrypting in the terminal. In other words, the operations for conversion carried out in the server and the terminal are different. In some cases, however, employing a same operation for conversion both in the server and the terminal is advantageous in increasing speed of an authentication process or in mounting a converting circuit. Therefore, in the present embodiment, the authentication is performed by employing a same operation for conversion both in the server and the terminal.

[Construction]

Figure 8:
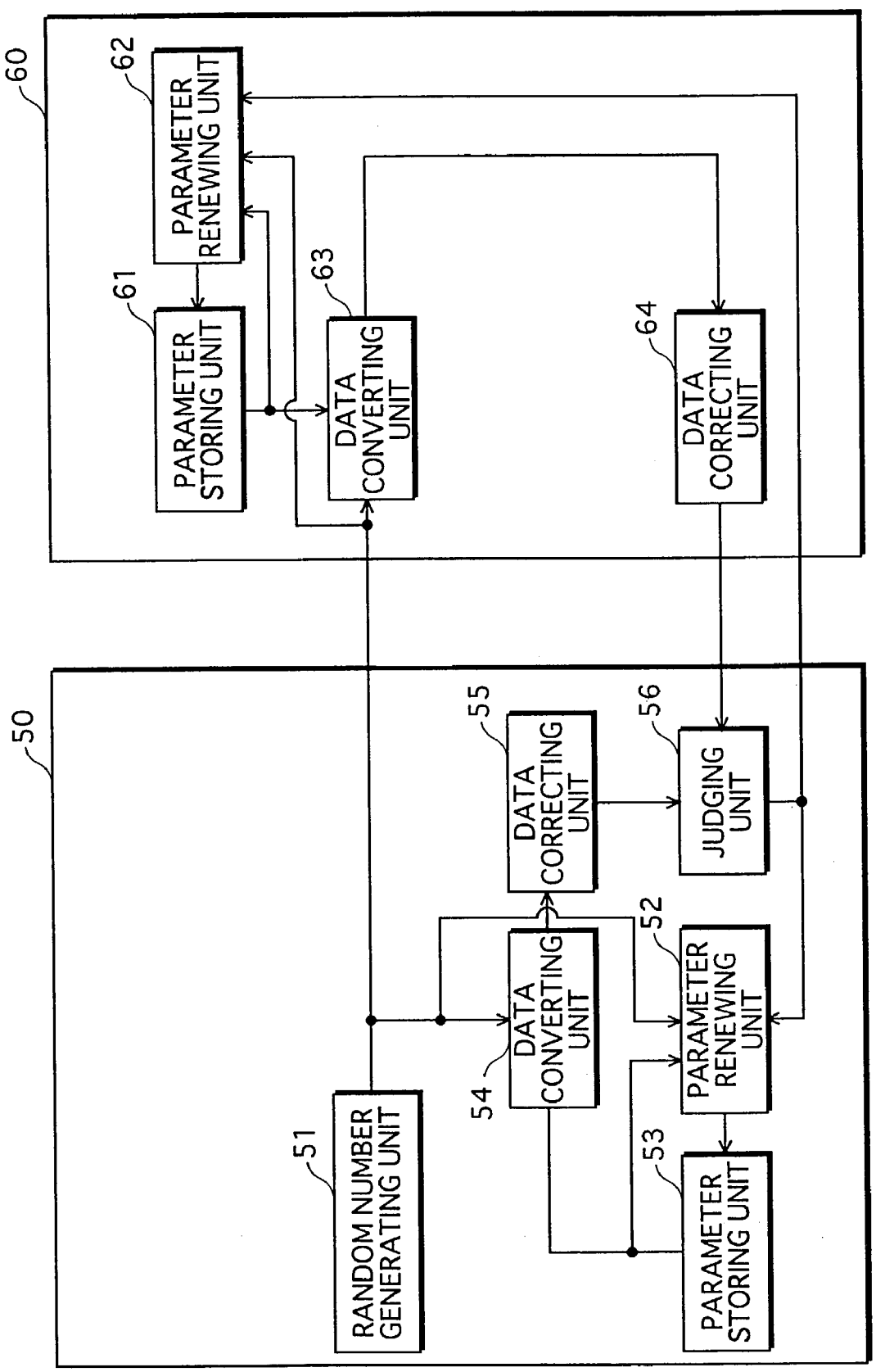
FIG. 8 shows a construction of a server and a terminal to realize an authentication method using a challenge and response system according to Third Embodiment.

FIG. 8 shows a construction of the server and the terminal to realize an authentication method using a challenge and response system according to Third Embodiment.

A server 50 comprises a random number generating unit 51, a parameter renewing unit 52, a parameter storing unit 53, a data converting unit 54, a data correcting unit 55, and a judging unit 56. The terminal 60 comprises a parameter storing unit 61, a parameter renewing unit 62, a data converting unit 63, and a data correcting unit 64.

The construction of the server 50 and the terminal 60 in the present embodiment is substantially the same as the server 10 and the terminal 20 in First Embodiment, and is only different in that the server 50 and the terminal 60 each include a data converting unit while the server 10 and the terminal 20 include the encrypting unit and the decrypting unit respectively. The construction of other units in the present embodiment is the same as First Embodiment, and therefore an explanation is not given here.

The data converting unit 54 converts the random number R as follows using the parameter K [i] stored in the parameter storing unit 53.

$$C=Tr(K[i],R)$$

Tr(X,Y) indicates an operation in which a 64-bit data Y is converted using a 56-bit parameter X, and a 64-bit data as a result is output.

As a method of conversion, DES is employed.

The data C generated by conversion at the data converting unit 54 is input to the data correcting unit 55.

The data converting unit 63, as with data converting unit 54, converts the random number R as follows using the parameter K [i] stored in the parameter storing unit 61.

$$P=Tr(K[i],R)$$

The data P generated by conversion at the data converting unit 63 is input to the data correcting unit 64.

Figure 9:
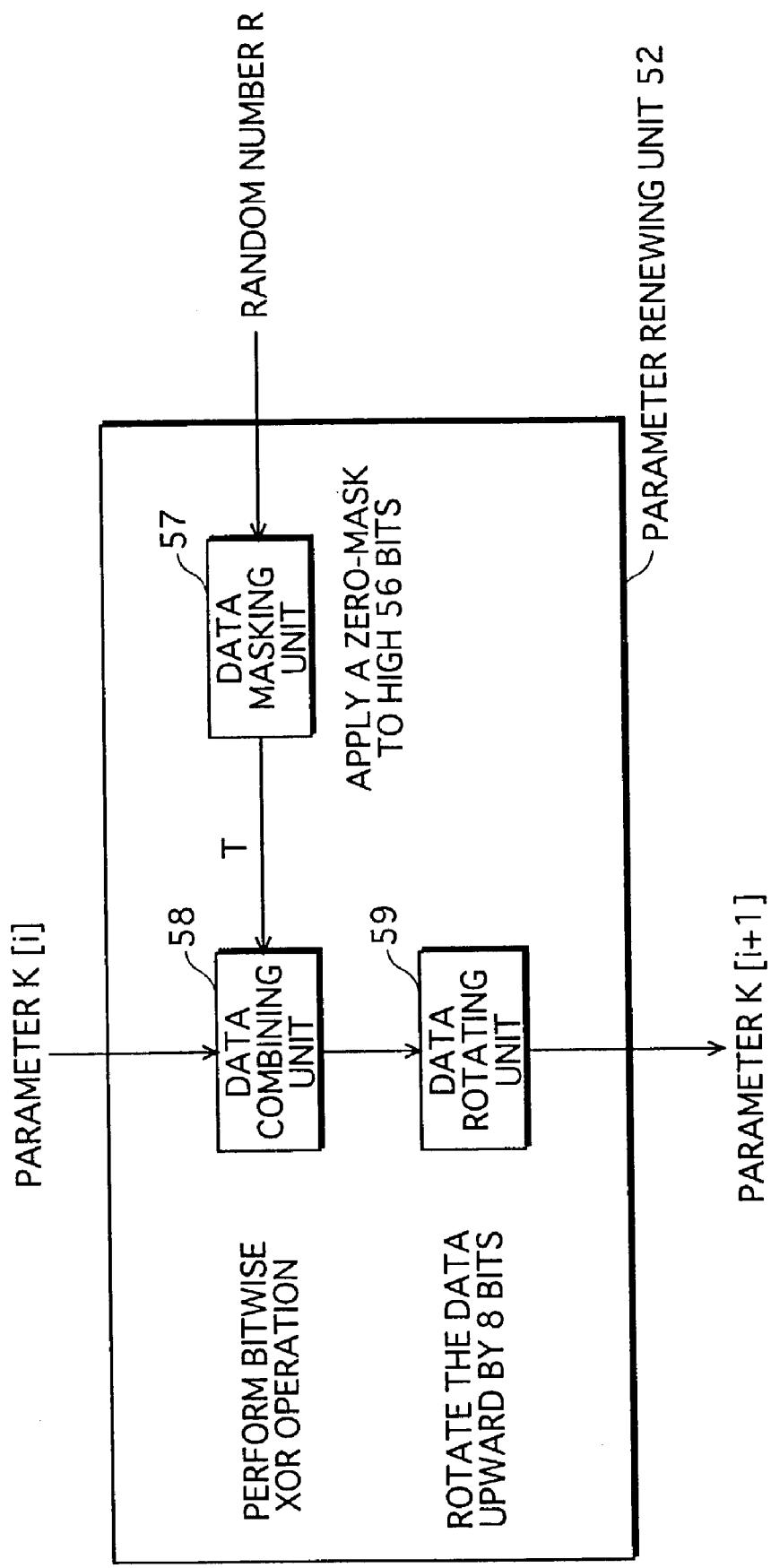
FIG. 9 shows a construction of a parameter renewing unit 52.

Further, details in a construction of the parameter renewing units 52 and 62 are given below FIG. 9 shows the construction of the parameter renewing unit 52.

The parameter renewing unit 52 comprises a data masking unit 57, a data combining unit 58, and a data rotating unit 59, and for renewing the parameter K [i] to the parameter K [i+1].

The data masking unit 57 applies a zero-mask to high 56 bits of the random number R, takes low 56 bits of the result as the data T, and sends the data T to the data combining unit 58. The random number R is a random number generated by the random number generating unit 51 in the status i.

The data combining unit 58 performs a bit wise XOR operation between the 56-bit parameter K [i] and the 56-bit data T, and outputs a result to the data rotating unit 59.

The data rotating unit 59 rotates the data from the data combining unit 58 upward by 8 bits, and outputs a result as the parameter K [i+1].

By the above construction, the parameter renewing unit 52 can perform a following operation.

$$K[i+1]=Rot8(K[i](+)T)$$

The parameter renewing unit 62 has the same construction with the parameter renewing unit 52.

As shown in the above, because the construction of the parameter renewing units 52 and 62 are substantially the same, parameter renewing units 52 and 62 both can renew the parameter K [i] to the parameter K [i+1].

[Operation]

An explanation about an operation of the server 50 authenticating the terminal 60 in the status i is given below. In the explanation, the server 50 and the terminal 60 each hold the identical parameter K [0] in the initial status, and the parameter K [i] in the status i.

Figure 10:
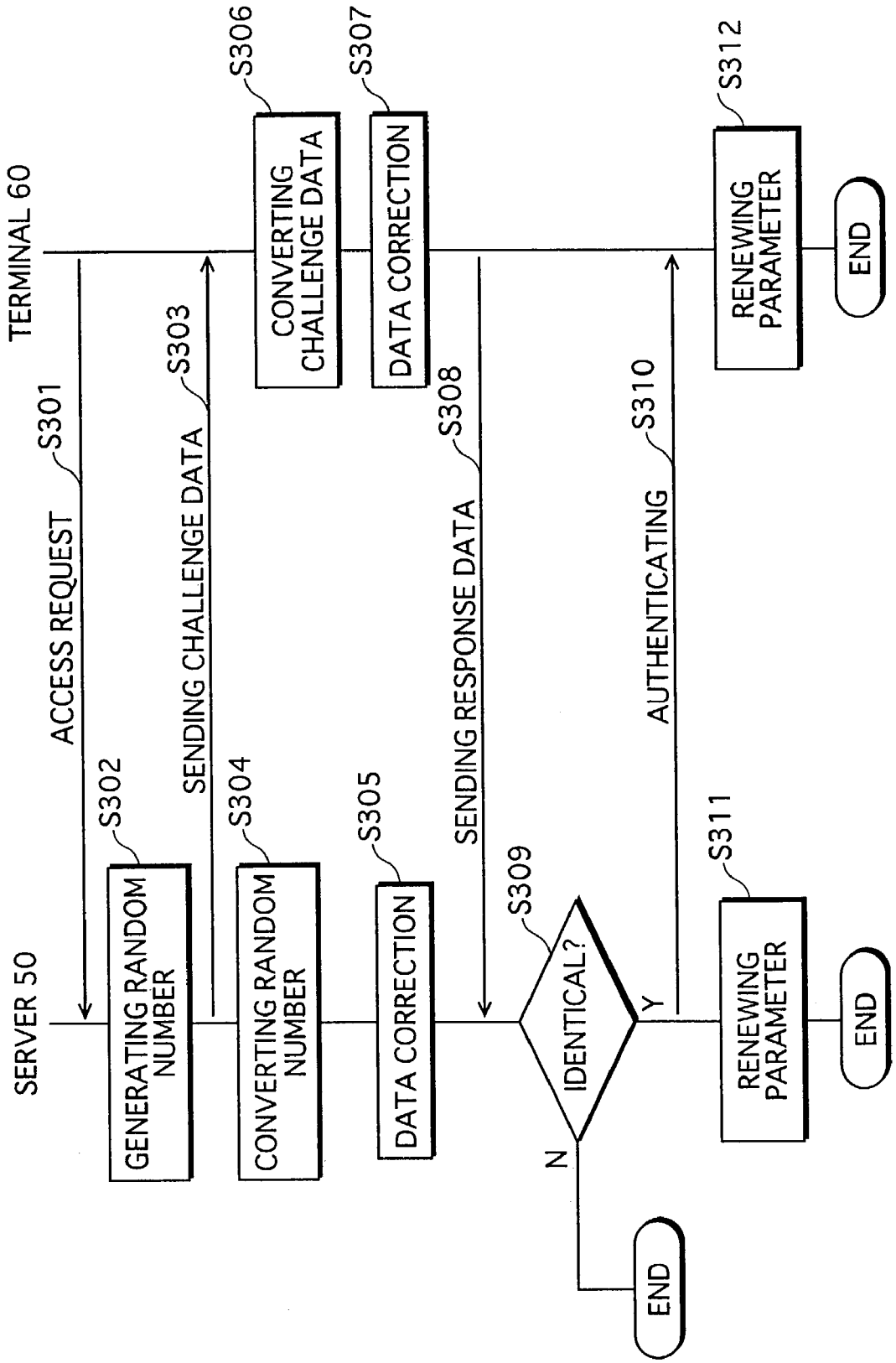
FIG. 10 shows an operation of the server and the terminal to realize the authentication method using a challenge and response system according to Third Embodiment.

FIG. 10 shows the operation of the server and the terminal to realize the authentication using a challenge and response system according to Third Embodiment.

First of all, the terminal 60 sends an access request to the server 50 (S301).

Upon receiving the access request from the terminal 60, the server 50 starts an authentication process to identify if the terminal 60 is authorized. First, the server 50 generates the 64-bit random number R at the random number generating unit 51 (S302)

Then, the server 50 inputs the random number R to the data converting unit 54, and sends the random number R as the piece of challenge data to the terminal 60 (S303).

The server 50 converts the random number R as follows at the data converting unit 54, using the parameter K [i] stored in the parameter storing unit 53 (S304).

$$C=Tr(K[i],R)$$

Then, the server 50 generates the 56-bit data S by truncating low 8 bits from the 64-bit data C (S305).

The terminal 60 receives the random number R as the piece of challenge data from the server 50. The terminal 60 converts the random number at the data converting unit 63 as follows, using the parameter K [i] stored in the parameter storing unit 61 (S306).

$$P=Tr(K[i],R)$$

Next, the terminal 60 generates the 56-bit data by truncating low 8 bits from the 64-bit converted data P at the data correcting unit 64 (S307).

Then, the terminal 60 sends the 56-bit data generated in S305 to the server 50 as the piece of response data Q (S308).

The server 50 inputs the piece of response data Q received in S308, and the data S generated in S305 into the judging unit 56. The judging unit 56 compares the two pieces of data to determine if the two pieces of data are identical. (S309).

When the piece of response data Q and the data S are not identical in S309 (S309N), the server 50 determines that the terminal 60 is unauthorized, and terminates the authentication process. In this case, the status i is not renewed.

When the piece of response data Q and the data S are identical in S309 (S309Y), the server 50 authenticates the terminal 60. In this case, the server 50 notifies the terminal 60 that the authentication was successful (S310).

Then, the server 50 derives the parameter K [i+1] by the following operation at the parameter renewing unit 52, using a 56-bit data T, whose high 48 bits are 0 and low 8 bits are taken from low 8 bits of the random number R, and a 56-bit parameter K [i] stored in the parameter storing unit 53.

$$K[i+1]=Rot8(K[i](+)T)$$

The server 50 replaces the parameter K [i] stored in the parameter storing unit 53 with the new parameter K [i+1], and sets the new parameter to be used in the next authentication process. (S311). By this operation, the status i increases by one.

Thus, the server 50 completes the authentication process.

Also, the terminal 60 derives the parameter K [i+1] by the following operation at the parameter renewing unit 62, after receiving the notification from the server 50 in S310, using a 56-bit data U, whose high 48 bits are 0 and low 8 bits are taken from low 8 bits of the random number R, and a 56-bit parameter K [i] stored in the parameter storing unit 61

$$K[i+1]=Rot8(K[i](+)U).$$

The terminal 60 replaces the parameter K [i] stored in the parameter storing unit 61 with the new parameter K [i+1], and sets the new parameter to be used in the next authentication process. (S312). By this operation, the status i increases by one.

Thus, the terminal 60 completes the authentication process.

In the present embodiment, as in First Embodiment, the parameter K [i], which is secretly assigned to both the server and the terminal, is renewed to the parameter K [i+1] every time authentication succeeds. In other words, the parameter used in a past authentication process is not necessarily identical to the parameter for the current authentication process. Unless the parameters used in the past and the current authentication processes are identical, the relation between the challenge data and the response data does not correspond. Therefore, by the present embodiment, it is possible to improve security against spoofing that eavesdrops on and stores the sets of a piece of challenge data and a piece of response data.

In addition, in the present embodiment, the conversion of the random number is carried out both in the server and the terminal at the same time, and accordingly, the authentication process is performed at higher speed in comparison with First Embodiment.

Further, in some cases, a two-way authentication system is employed, in which the server authenticates the terminal at a first stage and then the terminal authenticates the server at a second stage. In such a case, adopting the present embodiment enables the server and the terminal to each use the same data converting unit at the first and the second stage. Accordingly, it is possible to reduce the production cost in manufacturing the servers and the terminals. It also enables the size of the products to be made smaller.

Fourth Embodiment

[Outline]

In Third Embodiment, the parameters are renewed by the operation Rot8(X). The present embodiment performs an operation having a greater degree of variation, which further improves security against spoofing from an unauthorized terminal.

[Construction]

Figure 11:
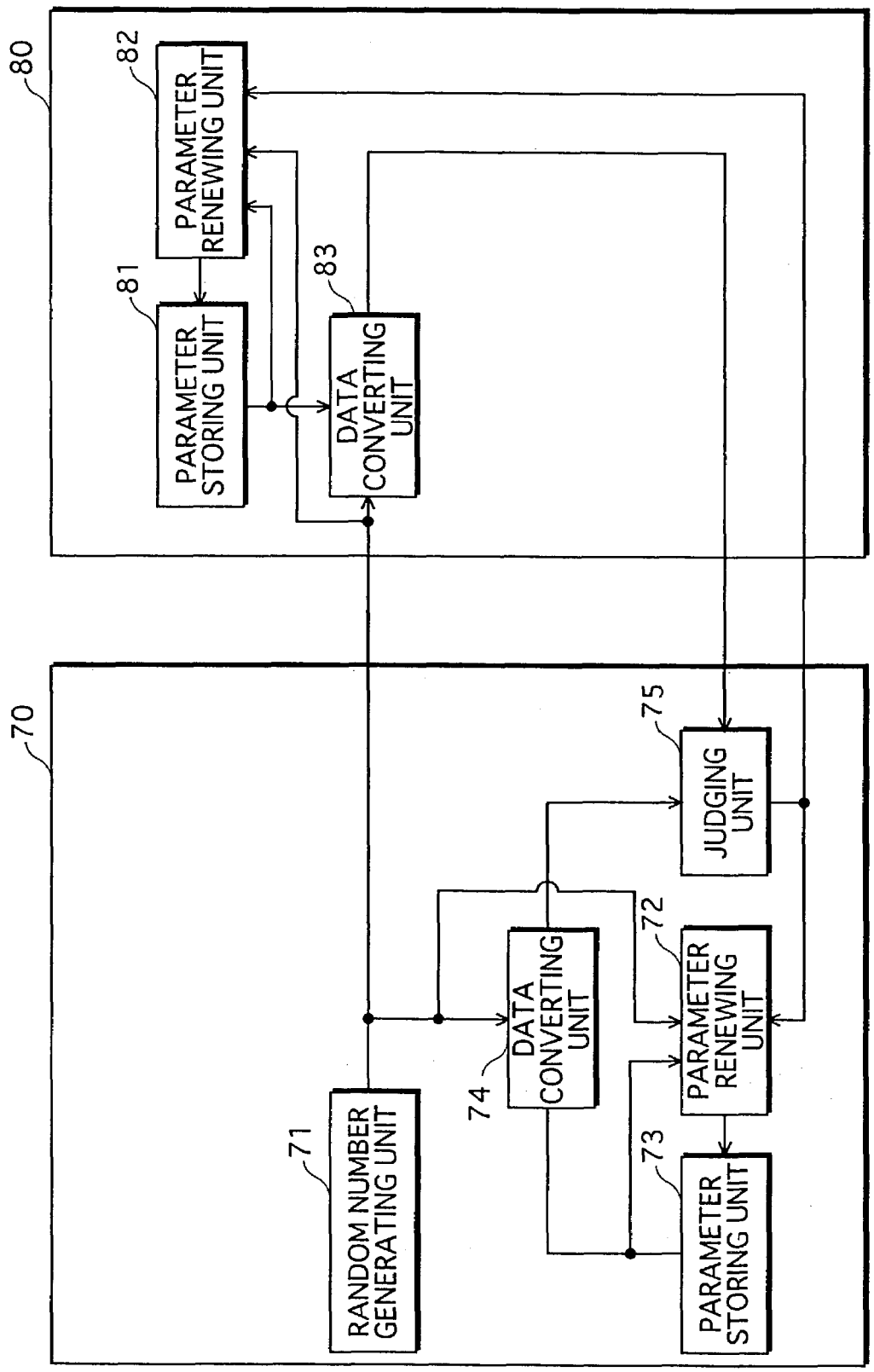
FIG. 11 shows a construction of a server and a terminal to realize an authentication method using a challenge and response system according to Fourth Embodiment.

FIG. 11 shows a construction of a server and a terminal to realize an authentication method using a challenge and response system according to Fourth Embodiment.

A server 70 comprises a random number generating unit 71, a parameter renewing unit 72, a parameter storing unit 73, a data converting unit 74, and a judging unit 75. The terminal 80 comprises a parameter storing unit 81, a parameter renewing unit 82, and a data converting unit 83.

The construction of the server 70 and the terminal 80 in the present embodiment is substantially the same as the server 50 and the terminal 60 in Third Embodiment, and is only different in that the construction of the present embodiment does not include a data correcting unit. The data correcting unit is for deriving a 56-bit data by truncating low 8 bits from a 64-bit data. Accordingly, while the judging unit 56 in the Third Embodiment compares two 56-bit data, the judging unit 75 in the present embodiment compares two 64-bit data.

Further, an operation for renewing a parameter K [i] to a new parameter K [i+1] at the parameter renewing units 72 and 82 in the present embodiment is different from the operation in Third Embodiment.

Specifically, the parameter K [i+1] is derived by the following operation at the parameter renewing units 72.

$$K[i+1]=MSB56(Tr(K[i],R))$$

In this operation, K[i] is a 56-bit parameter K [i] stored in the parameter storing unit 73, and R is a 64-bit random number R generated at the random number generating unit 71. MSB56(X) indicates an operation in which high 56 bits of data X is output. Tr(X,Y) indicates an operation in which a 64-bit data Y is converted using a 56-bit parameter X, and a 64-bit data as a result is output. As a method of conversion, DES is employed.

The parameter K [i+1] is derived by the following operation at the parameter renewing unit 82.

$$K[i+1]=MSB56(Tr(K[i],R))$$

In this operation, K[i] is a 56-bit parameter K [i] stored in the parameter storing unit 81, and R is a 64-bit random number R sent from the server 70. MSB56(X) indicates an operation in which high 56 bits of data X is output. Tr(X,Y) indicates an operation in which a 64-bit data Y is converted using a 56-bit parameter X, and a 64-bit data as a result is output. As a method of conversion, DES is employed.

Figure 12:
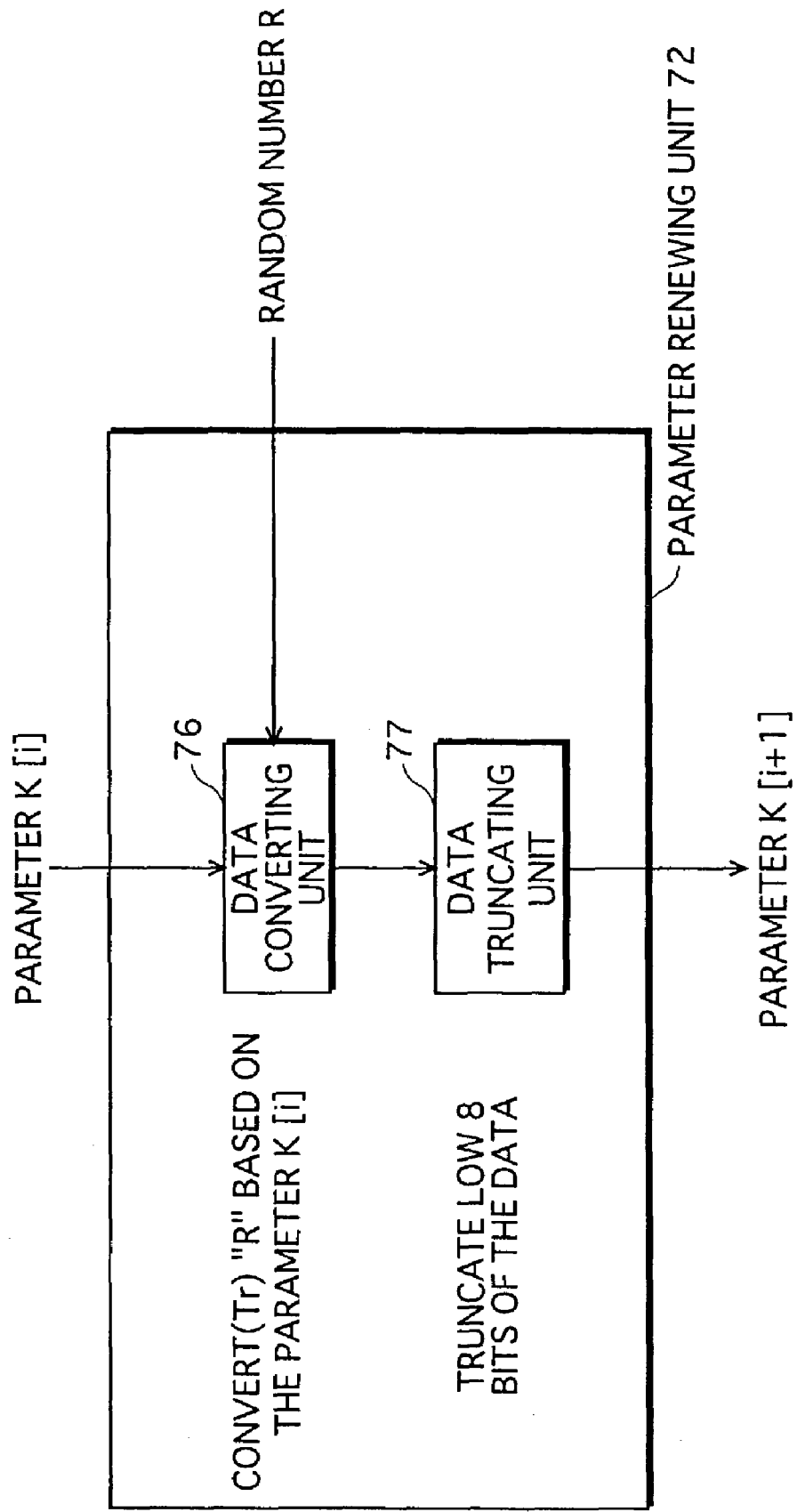
FIG. 12 shows a construction of a parameter renewing unit 72.

FIG. 12 shows a construction of the parameter renewing unit 72.

The data renewing unit 72 comprises a data converting unit 76 and a data truncating unit 77, for renewing the parameter K [i] to the parameter K [i+1] as described above.

The data converting unit 76 converts the 64-bit random number R based on the parameter K [i], and outputs a 64-bit data as a result to the data truncating unit 77. The random number R is a random number generated at the random number generating unit 71 in the status i. In addition, because the conversion performed by the data converting unit 76 is the same as the conversion performed by the data converting unit 74, it is possible to use the same converting unit for both conversions.

The data truncating unit 77 truncates low 8 bits from the 64-bit data, and outputs high 56 bits of the data as the parameter K [i].

By this, the parameter renewing unit 72 can perform the following operation.

$$K[i+1]=MSB56(Tr(K[i],R))$$

The parameter renewing unit 82 has a substantially same construction with the parameter renewing unit 72.

As shown in the above, because the construction of the parameter renewing units 72 and 82 are substantially the same, both parameter renewing units 72 and 82 can renew the parameter K [i] to the parameter K [i+1].

The construction of other units in the present embodiment is the same as Third Embodiment, and therefore an explanation is not given here.

[Operation]

An explanation about an operation in server 70 authenticating the terminal 80 in the status i is given below. In the explanation, the server 70 and the terminal 80 each hold the identical parameter K [0] in the initial status, and the parameter K [i] in the status i.

Figure 13:
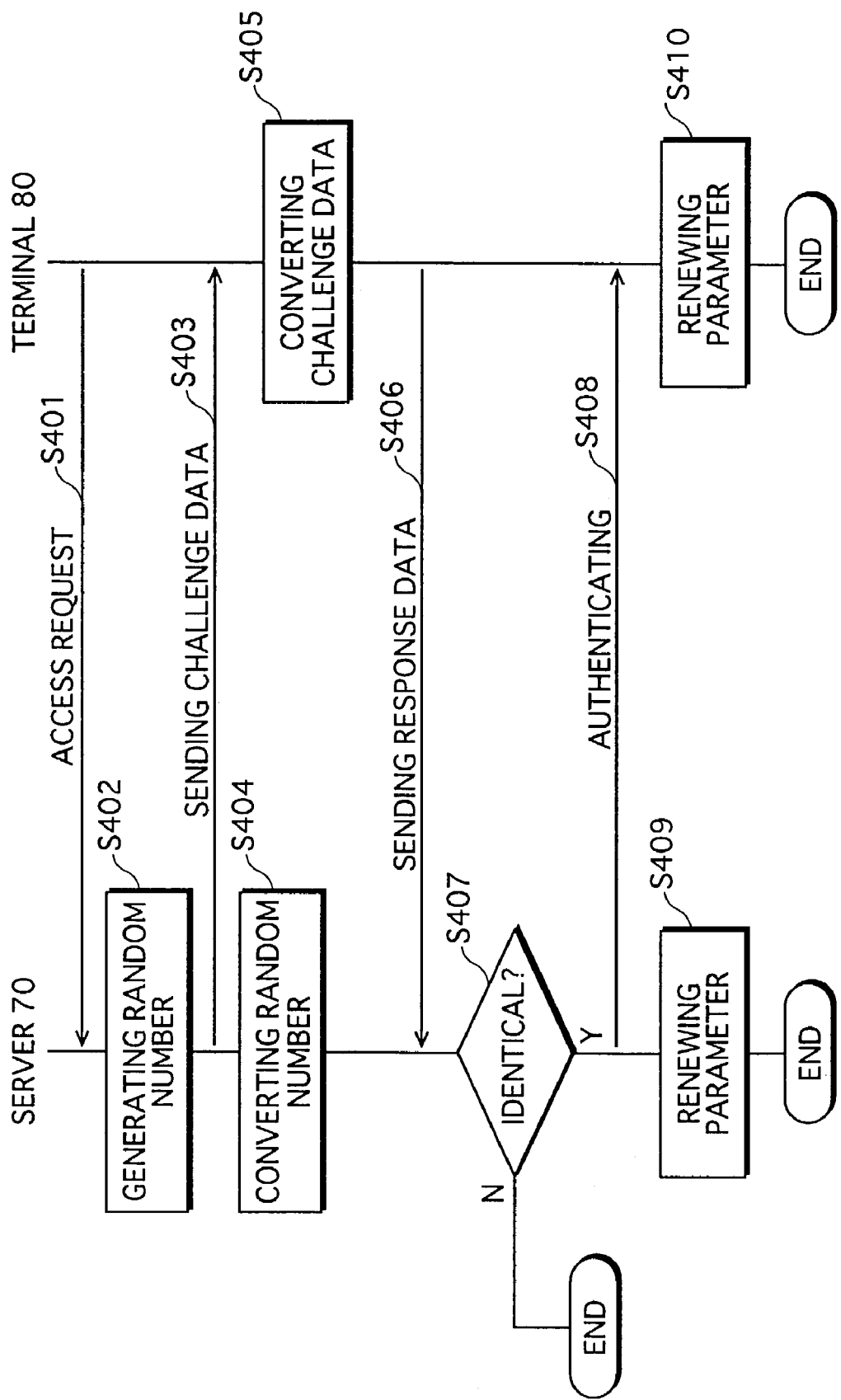
FIG. 13 shows an operation of the server and the terminal to realize the authentication method using a challenge and response system according to Fourth Embodiment.

FIG. 13 shows the operation of the server and the terminal to realize the authentication method using a challenge and response system according to Fourth Embodiment.

First of all, the terminal 80 sends an access request to the server 70 (S401).

Upon the access request from the terminal 80, the server 70 starts an authentication process to identify if the terminal 80 is authorized. First, the server 70 generates the 64-bit random number R at the random number generating unit 71 (S402)

Then, the server 70 inputs the random number R to the data converting unit 74, and sends the random number R as the piece of challenge data to the terminal 80 (S403).

The server 70 converts the random number R as follows at the data converting unit 74, using the parameter K [i] stored in the parameter storing unit 73 (S404).

$$C=Tr(K[i],R)$$

The terminal 80 receives the random number R as the piece of challenge data from the server 70. The terminal 80 converts the random number at the data converting unit 83 as follows, using the parameter K [i] stored in the parameter storing unit 81 (S405).

$$P=Tr(K[i],R)$$

Then, the terminal 80 inputs the converted data P to the parameter renewing unit 82, and sends the 64-bit converted data as the piece of response data to the server 70 (S406).

The server 70 inputs the piece of response data received in S406, and the random number R generated in S402 into the judging unit 75. The judging unit 75 compares the two pieces of data to determine if the two pieces of data are identical. (S407).

When the piece of response data and the random number R are not identical in S407 (S407N), the server 70 determines that the terminal 80 is unauthorized, and terminates the authentication process. In this case, the status i is not renewed.

When the response data and the random number Rare identical in S407 (S407Y), the server 70 authenticates the terminal 80. In this case, the server 70 notifies the terminal 80 that the authentication was successful (S408).

Then, the server 70 derives the parameter K [i+1] by the following operation at the parameter renewing unit 72.

$$K[i+1]=MSB56(Tr(K[i],R))$$

The server 70 replaces the parameter K [i] stored in the parameter storing unit 73 with the new parameter K [i+1], and sets the new parameter to be used in the next authentication process. (S409). By this operation, the status i increases by one.

Thus, the server 70 completes the authentication process.

Also, the terminal 80 derives the parameter K [i+1] by the following operation at the parameter renewing unit 82, after receiving the notification from the server 70 in S408.

$$K[i+1]=MSB56(Tr(K[i],R))$$

The terminal 80 replaces the parameter K [i] stored in the parameter storing unit 81 with the new parameter K [i+1], and sets the new parameter to be used in the next authentication process. (S410). By this operation, the status i increases by one.

Thus, the terminal 80 completes the authentication process.

A number of steps required in the present embodiment becomes larger in comparison with Third Embodiment, because the server 70 and the terminal 80 each are required to perform DES encryption two times in every authentication process. However, while the operation in Third Embodiment for renewal of the parameter is Rot(X), a simple data rotation of a bit string, the operation performed in the present embodiment is Tr(X,Y), and a degree of variation from the parameter K [i] to the parameter K [i+1] is large. Therefore, it is possible to further improve security by the present embodiment.

Note that, while the random number R is 64-bit and the parameter K [i] is 54-bit in all embodiments of the present invention, sizes of the data can be other than 64-bit and 56-bit.

In all embodiments, DES encryption is employed as the conversion method used in the encrypting units, the decrypting units, and the data converting units. However, if it is difficult to derive X in a conversion Z=F(X,Y) when Y and Z are given, another conversion method can be employed.

Further, the operation that the parameter renewing unit derives the new parameter K [i+1] is not limited to the operations explained in each embodiment. Such operations that can determine output data corresponding to input data in a unique way can also be used.

In addition, in all embodiments of the present invention, the security against spoofing is improved by renewing the parameter. The same effect can be obtained by renewing the parameter for encrypting and decrypting, with a translation table value (Sbox) for encryption, for example.

Moreover, while the parameter is always renewed when the server authenticates the terminal in all embodiments in the present invention, it is also possible that the parameter is renewed when the server authenticates the terminal and the server sends a signal to instruct the terminal to renew the parameter.

Further, although the data correcting unit outputs the data truncated low 8 bits in First and Third Embodiments, correction of the data can be done in another way if the partial data can be extracted from the input data.

In all embodiments, it is possible to take care of dephasing of the parameters in a following way.

The dephasing of the parameters is a case where the status i in the server and the terminal are not identical.

When the dephasing happens, the parameters stored in the server and the terminal are different, and accordingly, the server does not authenticate the terminal even if the terminal is authorized.

Therefore, the server resets the status i to 0 when the judging unit finds the two pieces of data are not identical, and thus initializes the parameter stored in the parameter storing unit to the parameter K [0]. The terminal initializes the parameter stored in the parameter storing unit to the parameter K [0] when the terminal is not authenticated by the server.

In this way, the parameters in the server and the terminal become K [0] and identical.

Thus, the terminal can be authenticated by the server by sending an access request to the server again.

Further, while the relationship between the server and the terminal is one-to-one in all embodiments of the present invention, there can be more than one terminal.

When there is more than one terminal to one server, it is possible to manage the parameter in two ways: a first case, in which the server stores each parameter for each terminal, and a second case, in which the server stores a common parameter for plural terminals.

In the first case, the server assigns an ID to each terminal in advance, and parameters are stored associated with each ID.

According to the first case, the server obtains the ID from the terminal before the authentication process starts, specifies the terminal by the ID, and processes the authentication using a unique parameter for the terminal.

On the other hand, in the second case, the dephasing of parameters is inevitable, and therefore, the server is required to have a way to deal with the dephasing. One way to deal with the dephasing is initialization of the parameter as has been described above. However, when the parameters are initialized very often, the security against spoofing becomes low. Further explanation is given below, taking an example of a case where there are three authorized terminals A, B, and C, and the server performs authentication processes in alphabetical order.

First, the server authenticates the terminal A, and the parameter K [0] is renewed to K [1].

Next, the server authenticates the terminal B. If the terminal B holds the parameter K [1] by chance, the authentication succeeds and the parameters of the server and the terminal are renewed to K [2]. However, the parameter in the terminal B is not necessarily K [1]. If the terminal B holds the parameter other than K [1], the parameters of the server and the terminal B are initialized to K [0], the authentication process is performed again, and the server authenticates the terminal B. The parameter K [0] is renewed to K [1].

Then, the server authenticates the terminal C. If the terminal C holds the parameter K [1] by chance, the authentication succeeds and the parameters of the server and the terminal are renewed to K [2]. However, the parameter in the terminal C is not necessarily K [1]. If the terminal C holds the parameter other than K [1], the parameters of the server and the terminal C are initialized to K [0], the authentication process is performed again, and the server authenticates the terminal C. The parameter K [0] is renewed to K [1].

As has been described, if the terminal which is currently under the authentication process is different from the terminal which has been authenticated the last time, it is highly probable that the parameter used in an authentication process is always the same: the parameter K [0]. In such a case, there is practically little difference from the conventional case where only one parameter is used, and accordingly, the security against spoofing cannot be improved very much. Especially since the greater the number of terminals, the higher the possibility becomes that the terminal which is currently under the authentication process is different from the terminal which has been authenticated the last time. Accordingly, the problem becomes greater.

An example to avoid the above problem in the second case is explained below. In this example, the terminal that tries to access the server synchronizes its parameter with the parameter of the server before the authentication process.

Figure 14:
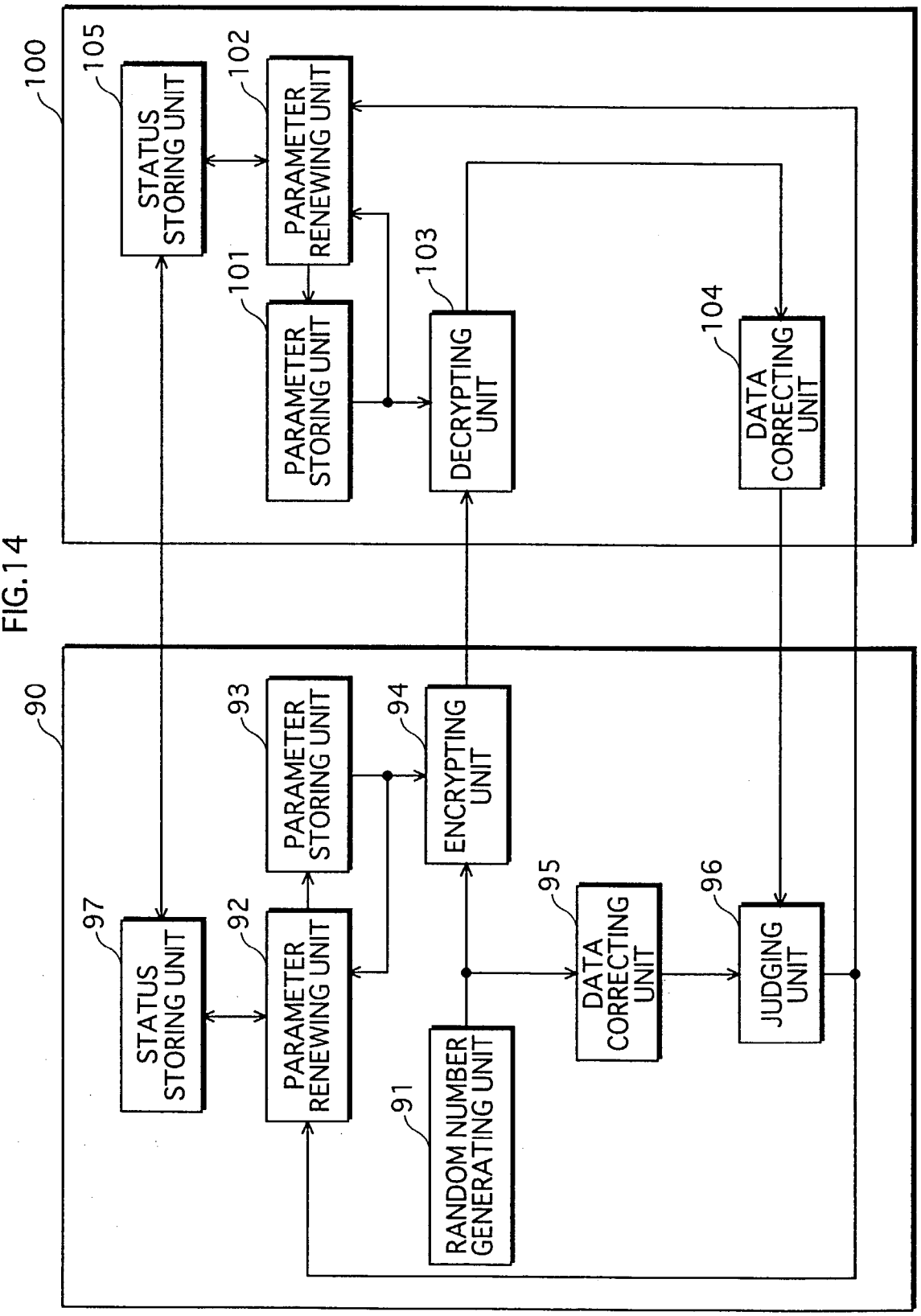
FIG. 14 shows a construction of a server and a terminal to realize an authentication method using a challenge and response system according to a second case.

FIG. 14 shows a construction of a server and a terminal to realize an authentication method using a challenge and response system according to the second case.

The server 90 comprises a random number generating unit 91, a parameter renewing unit 92, a parameter storing unit 93, an encrypting unit 94, a data correcting unit 95, a judging unit 96, and a status storing unit 97.

The terminal 100 comprises a parameter storing unit 101, a parameter renewing unit 102, a decrypting unit 103, a data correcting unit 104, and a status storing unit 105.

The server 90 and the terminal 100 have a substantially same construction with the server 10 and the terminal 20 of First Embodiment, and are only different in that the server 90 and the terminal 100 include the status storing units 97 and 105 respectively.

The status storing unit 97 and the status storing unit 105 stores the status i, and the status i increases by one every time the authentication succeeds. Specifically, counters can be used as the status storing units.

In addition, an operation in which the parameter renewing unit 92 and the parameter renewing unit 102 renew the parameter K [i] to a new parameter K [i+1] in the second case is different from the operation in First Embodiment.

Specifically, the parameter K [i+1] is derived by an operation as follows, using a 64-bit data W, whose high 8 bits is 0 and low 56 bits is the 56-bit parameter K [i] stored in the parameter storing unit 93 and 101, and the 56-bit parameter K [i].

$$K[i+1]=MSB56(Enc(K[i],W))$$

In this operation, Enc(X,Y) indicates an operation in which a 64-bit data is derived by encrypting the 64-bit data Y using the 56-bit parameter X.

As a method of encryption, DES is employed.

Note that the random number is not used in this operation. Consequently, if a difference (n–m) between a status (m) of the terminal and a status (n) of the server is given, the terminal 100 can generate the parameter that is currently stored in the server 90.

The construction of the rest of the part are the same as First Embodiment.

An explanation about the operation to synchronize the parameters before an authentication process starts is given below.

First, when the terminal 100 sends an access request to the-server 90, the server 90 notifies the terminal 100 the status (n) stored in the status storing unit 97.

Upon the notification from the server 90, the terminal 100 looks up the status (m) of the terminal. From the status (m) and (n), the terminal 100 calculates the difference (n–m) between the server 90 and the terminal 100.

The terminal 100 obtains the parameter K [n] stored in the server 90 by performing the following operation (n–m) times.

$$K[i+1]=MSB56(Enc(K[i],W))$$

In this way, it is possible in the second case that the terminal trying to access the server can synchronize the parameter of the terminal with the parameter of the server before the authentication process starts.

In the above explained operation, the conversion must be carried out (n–m) times in the parameter renewing unit 102. The more terminals the server has, the larger number of times the conversion must be performed. When the operation must be performed many times, the operation takes longer depending on the power of the terminal. Another example to avoid this problem is explained below.

Figure 15:
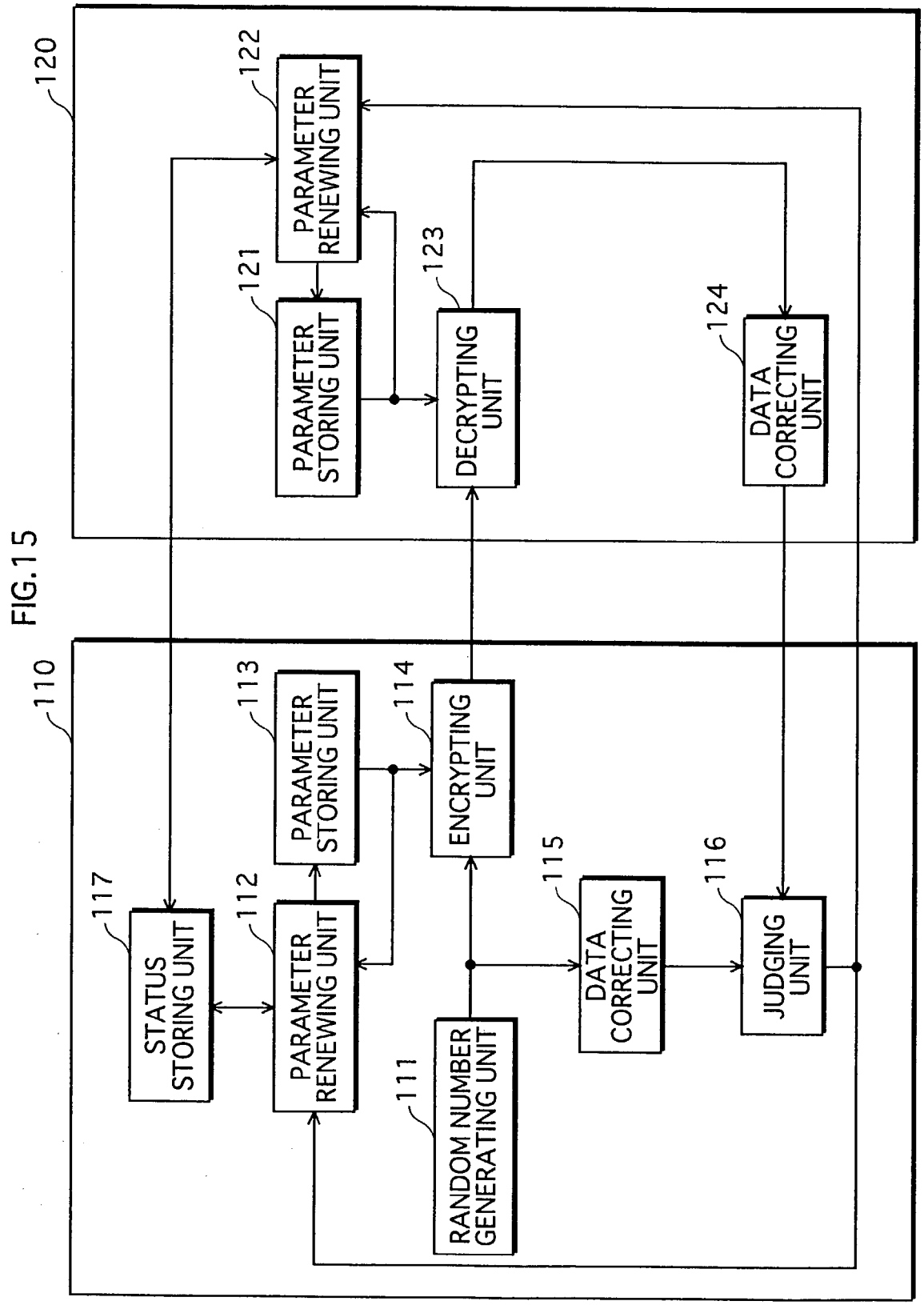
FIG. 15 shows another construction of a server and a terminal to realize an authentication method using a challenge and response system according to the second case.

FIG. 15 shows another construction of the server and the terminal to realize an authentication using a challenge and response system according to the second case.

The server 110 comprises a random number generating unit 111, a parameter renewing unit 112, a parameter storing unit 113, an encrypting unit 114, a data correcting unit 115, a judging unit 116, and a status storing unit 117. The terminal 120 comprises a parameter storing unit 121, a parameter renewing unit 122, a decrypting unit 123, and a data correcting unit 124.

The construction shown in FIG.15 is the same as the construction of FIG.14 with the status storing unit 105 removed from the terminal 100. In addition, the operation to renew the parameter K [i] to a new parameter K [i+1] in the parameter renewing units 112 and 122 are different.

Specifically, the parameter K [i+1] is derived by an operation as follows using a counter value CNT, which is a value in a counter in the status storing unit 117 expressed in 64-bit value, and the 56-bit parameter K [0] which is assigned to both the server 110 and the terminal 120 in advance. The counter value CNT is the value when the status i is increased by one after a successful authentication.

$$K[i+1]=MSB56(Enc(K[0],CNT))$$

In this operation, Enc(X,Y) indicates an operation in which a 64-bit data is derived by encrypting the 64-bit data Y using the 56-bit parameter X.

As a method of encryption, DES is employed.

Note that the random number and the parameter K [i] are not used in this operation. Consequently, if the counter value CNT stored in the status storing unit 117 is given, the terminal 120 can generate the parameter that is currently stored in the server 110 without performing (n–m) times operation.

The construction of the rest of the part is the same as First Embodiment.

An explanation of the operation to synchronize the parameters before the authentication process starts is given below.

First, when the terminal 120 sends an access request to the server 110, the server 110 notifies the terminal 120 the counter value CNT stored in the status storing unit 117.

The terminal 120 obtains the parameter K [i] stored in the server 110 by performing the following operation in the parameter renewing unit 122.

$$K[i+1]=MSB56(Enc(K[0],CNT))$$

In this way, it is possible in the second case that the terminal trying to access the server can synchronize the terminal parameter with the server parameter before the authentication process starts.

Note that the above explained examples to deal with the dephasing of the parameters can be applied to all embodiments in the present invention.

Further, note that all the embodiments in the present invention can be applied to a Keyless Entry System (RKE) equipped on a vehicle. In this case, the server is an in-vehicle unit, and the terminal is a remote controller.

Although the present invention has been fully described by way of examples with reference to the accompanying drawings, it is to be noted that various changes and modifications will be apparent to those skilled in the art. Therefore, unless otherwise such changes and modifications depart from the scope of the present invention, they should be construed as being included therein.

What is claimed is:

1. A method for authentication using a challenge and response system between a first apparatus and a second apparatus, the first apparatus having a first converting unit that performs a first conversion, the second apparatus having a second converting unit that performs a second conversion, a relation between the first conversion and the second conversion being identical or reverse, the method comprising:

an authenticating step of sending a piece of challenge data from the first apparatus to the second apparatus, sending a piece of response data from the second apparatus to the first apparatus, the piece of response data having been converted from the piece of challenge data by the second conversion, judging in the first apparatus, based on the first conversion, whether the piece of response data is converted from the piece of challenge data by the second conversion, and authenticating the second apparatus if a result of the judgment is affirmative; and a setting step of, when the result of the judgment in the authenticating step is affirmative, setting a first conversion and a second conversion to be used in a next authentication, instead of the first conversion and the second conversion used in a current authentication, respectively, a content of the first conversion and the second conversion for the next authentication being different from a content of the first conversion and the second conversion used in the current authentication, and a relation between the first conversion and the second conversion for the next authentication being the same as the relation between the first conversion and the second conversion used in the current authentication.

2. A method for authentication according to claim 1, wherein in the setting step, when the result of the judgment in the authenticating step is negative, the first conversion and the second conversion used in the current authentication are set to be used in the next authentication.

3. A first apparatus for authenticating a second apparatus using a challenge and response system, a relation between a first conversion and a second conversion being identical or reverse, the first apparatus comprising:

an authenticating unit operable to send a piece of challenge data to the second apparatus, receive a piece of response data from the second apparatus, the piece of response data having been converted from the piece of challenge data by the second conversion, judge based on the first conversion whether the piece of response data is converted from the piece of challenge data by the second conversion, and authenticate the second apparatus if a result of the judgment is affirmative; and a setting unit operable to, when the result of the judgment in the authenticating unit is affirmative, set a first conversion to be used in a next authentication, instead of the first conversion used in the current authentication, a content of the first conversion for the next authentication being different from a content of the first conversion used in the current authentication, and a relation between the first conversion and a second conversion for the next authentication being the same as the relation between the first conversion and the second conversion used in the current authentication.

4. A first apparatus according to claim 3, wherein the setting unit sets the first conversion used in the current authentication process to be used in the next authentication process, when the result of the judgment in the authenticating unit is negative.

5. A first apparatus according to claim 3, wherein the first conversion and the second conversion are based on an identical parameter assigned to both the first conversion and the second conversion, and the setting unit obtains a parameter to be used in the next authentication when the result of the judgment in the authenticating unit is affirmative, by performing a predetermined operation on the parameter currently used, the predetermined operation is stored both in the first apparatus and the second apparatus in advance.

6. A first apparatus according to claim 5, wherein the setting unit sets the parameter to an initial value assigned to both the first apparatus and the second apparatus in advance, when the result of the judgment in the setting unit is negative.

7. A first apparatus according to claim 5, wherein the setting unit further comprises:

a parameter information obtaining unit operable to obtain predetermined parameter information; and a parameter information sending unit operable to send the predetermined parameter information to the second apparatus when the result of the judgment in the authenticating unit is negative, and wherein the setting unit obtains the parameter to be used in the next authentication by performing the predetermined operation on the predetermined parameter information.

8. A first apparatus according to claim 3, wherein the relation between the first conversion and the second conversion is reverse, and the authenticating unit comprises:

a challenge data generating unit operable to generate the piece of challenge data by performing the first conversion on a generated random number;

a challenge data sending unit operable to send the piece of challenge data to the second apparatus; and a response data receiving unit operable to receive the piece of response data from the second apparatus, the piece of response data being converted from the piece of challenge data by the second conversion, the authenticating unit judging that the piece of response data is generated by performing the second conversion on the piece of challenge data, when the piece of response data received by the response data receiving unit is identical to the random number.

9. A first apparatus according to claim 3, wherein the relation between the first conversion and the second conversion is identical, and the authenticating unit comprising:

a random number generating unit operable to generate a random number;

a challenge data sending unit operable to send the random number as the piece of challenge data to the second apparatus;

a response data receiving unit operable to receive the piece of response data from the second apparatus, the piece of response data being converted from the piece of challenge data by the second conversion; and a challenge data converting unit operable to perform the first operation on the random number, and wherein the authenticating unit judges that the piece of response data is generated by performing the second conversion on the piece of challenge data, when the piece of response data received by the response data receiving unit is identical to the random number converted by the challenge data converting unit.

10. A second apparatus for being authenticated by a first apparatus using a challenge and response system, a relation between a first conversion and a second conversion being identical or reverse, the second apparatus comprising:

a challenge data receiving unit operable to receive a piece of challenge data sent from the first apparatus;

a response data generating unit operable to generate a piece of response data by performing the second conversion on the piece of challenge data received by the challenge data receiving unit;

a response data sending unit operable to send the piece of response data generated by the response data generating unit to the first apparatus; and a setting unit operable to, after performing the second conversion in the response data generating unit, set a second conversion to be used in a next authentication instead of the second conversion used in the current authentication, a content of the second conversion for the next authentication being different from a content of the second conversion used in the current authentication, and a relation between a first conversion and the second conversion for the next authentication being the same as the relation between the first conversion and the second conversion used in the current authentication.

11. A second apparatus according to claim 10, wherein the setting unit sets the second conversion to be used in the next authentication instead of the second conversion used in the current authentication when the second apparatus is notified of an affirmative result from the first apparatus after the first apparatus judges based on the first conversion if the piece of response data is converted from the piece of challenge data by the second conversion, the content of the second conversion for the next authentication being different from the content of the second conversion used in the current authentication.

12. A second apparatus according to claim 10, wherein the first conversion and the second conversion are based on an identical parameter assigned to both the first conversion and the second conversion, and
the setting unit further sets the parameter to an initial value assigned to both the first apparatus and the second apparatus in advance, when the second apparatus is notified of an affirmative result by the first apparatus after the first apparatus judges based on the first conversion if the piece of response data is converted from the piece of challenge data by the second conversion.

13. A second apparatus according to claim 12, wherein the setting unit further comprises:
a parameter information obtaining unit for obtaining predetermined parameter information, when the result of the judgment is negative and the predetermined parameter information is sent from the first apparatus, and wherein
the setting unit obtains a parameter to be used in the next authentication by performing the predetermined operation on the predetermined parameter information, and the predetermined operation is stored both in the first apparatus and the second apparatus in advance.

14. An authentication system using a challenge and response system between a first apparatus and a second apparatus, a relation between a first conversion and a second conversion being identical or reverse, the authentication system comprising:
an authenticating unit operable to send a piece of challenge data from the first apparatus to the second apparatus, send a piece of response data from the second apparatus to the first apparatus, the piece of response data having been converted from the piece of challenge data by the second conversion, judge in the first apparatus, based on the first conversion, whether the piece of response data is converted from the piece of challenge data by the second conversion, and authenticate the second apparatus if a result of the judgment is affirmative; and
a setting unit operable to, when the result of the judgment in the authenticating unit is affirmative, set a first conversion and a second conversion to be used in a next authentication, instead of the first conversion and the second conversion used in the current authentication, respectively, a content of the first conversion and the second conversion for the next authentication being different from a content of the first conversion and the second conversion used in the current authentication, and a relation between the first conversion and the second conversion for the next authentication being the same as the relation between the first conversion and the second conversion used in the current authentication.

15. A keyless entry system using a challenge and response system between an in-vehicle unit and a remote controller, a relation between a first conversion and a second conversion being identical or reverse, the keyless entry system comprising:
an authenticating unit operable to send a piece of challenge data from the in-vehicle unit to the remote controller, send a piece of response data from the remote controller to the in-vehicle unit, the piece of response data having been converted from the piece of challenge data by the second conversion, judge in the in-vehicle unit, based on the first conversion, whether the piece of response data is converted from the piece of challenge data by the second conversion, and authenticate the remote controller if a result of the judgment is affirmative; and
a setting unit operable to, when the result of the judgment in the authenticating unit is affirmative, set a first conversion and a second conversion to be used in a next authentication, instead of the first conversion and the second conversion used in the current authentication, respectively, a content of the first conversion and the second conversion for the next authentication being different from a content of the first conversion and the second conversion used in the current authentication, and a relation between the first conversion and the second conversion for the next authentication being the same as the relation between the first conversion and the second conversion used in the current authentication.

16. A vehicle equipped with a keyless entry system using a challenge and response system between an in-vehicle unit and a remote controller, a relation between a first conversion and a second conversion being identical or reverse, the keyless entry system comprising:
an authenticating unit operable to send a piece of challenge data from the in-vehicle unit to the remote controller, send a piece of response data from the remote controller to the in-vehicle unit, the piece of response data having been converted from the piece of challenge data by the second conversion, judge in the in-vehicle unit, based on the first conversion, whether the piece of response data is converted from the piece of challenge data by the second conversion, and authenticate the remote controller if a result of the judgment is affirmative; and
a setting unit operable to, when the result of the judgment in the authenticating unit is affirmative, set a first conversion and a second conversion to be used in a next authentication, instead of the first conversion and the second conversion used in the current authentication respectively, a content of the first conversion and the second conversion for the next authentication being different from a content of the first conversion and the second conversion used in the current authentication, and a relation between the first conversion and the second conversion for the next authentication being the same as the relation between the first conversion and the second conversion used in the current authentication.

* * * * *